(12) United States Patent
Agiwal et al.

(10) Patent No.: US 9,955,509 B2
(45) Date of Patent: Apr. 24, 2018

(54) APPARATUS AND METHOD FOR AVOIDING COLLISION BETWEEN RANDOM ACCESS TRANSMISSION AND DEVICE TO DEVICE TRANSMISSION IN COMMUNICATION SYSTEM SUPPORTING DEVICE TO DEVICE SCHEME

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 171 days.

(21) Appl. No.: 14/602,705

(22) Filed: Jan. 22, 2015

(65) Prior Publication Data
US 2015/0208440 A1    Jul. 23, 2015

(30) Foreign Application Priority Data

Jan. 22, 2014 (IN) ............................ IN96/KOL/2014
Jul. 11, 2014 (IN) ......................... IN753/KOL/2014

(51) Int. Cl.
*H04W 74/08*   (2009.01)
*H04L 1/00*     (2006.01)
(Continued)

(52) U.S. Cl.
CPC ............ *H04W 74/085* (2013.01); *H04L 1/00* (2013.01); *H04W 72/02* (2013.01); *H04W 92/18* (2013.01)

(58) Field of Classification Search
CPC ... H04W 74/085; H04W 72/02; H04W 92/18; H04L 1/00
See application file for complete search history.

(56) References Cited

U.S. PATENT DOCUMENTS

2012/0127964 A1* 5/2012 Turtinen .......... H04W 56/0045
                                                            370/336
2012/0129540 A1* 5/2012 Hakola ............... H04W 72/042
                                                            455/450
(Continued)

FOREIGN PATENT DOCUMENTS

WO    2013/191360 A1   12/2013

OTHER PUBLICATIONS

LG Electronics, Resource Management for D2D Communications, 3GPP TSG RAN WG1 Meeting #74, R1-133791, Aug. 19-23, 2013, p. 3 and figure 3, Barcelona, Spain.

*Primary Examiner* — Ajay Cattungal
(74) *Attorney, Agent, or Firm* — Jefferson IP Law, LLP

(57) ABSTRACT

A method for avoiding a collision between a device to device (D2D) transmission and a random access transmission by a user equipment (UE) in a communication system supporting a D2D scheme is provided. The method includes detecting resource configuration information related to a random access transmission and resource configuration information related to a D2D transmission, determining a result on whether a resource in which a D2D resource which corresponds to the resource configuration information related to the D2D transmission is included includes a random access resource which corresponds to the resource configuration information related to the random access transmission, and avoiding using the resource or the random access resource for the D2D transmission based on the determined result.

10 Claims, 22 Drawing Sheets

(51) Int. Cl.
   *H04W 72/02*      (2009.01)
   *H04W 92/18*      (2009.01)

(56) References Cited

U.S. PATENT DOCUMENTS

| | | | |
|---|---|---|---|
| 2012/0287877 A1* | 11/2012 | Han | H04W 74/002 |
| | | | 370/329 |
| 2013/0148566 A1 | 6/2013 | Doppler et al. | |
| 2014/0010172 A1 | 1/2014 | Wei et al. | |
| 2014/0206322 A1* | 7/2014 | Dimou | H04W 4/005 |
| | | | 455/414.1 |
| 2016/0150580 A1* | 5/2016 | Kim | H04W 72/04 |
| | | | 370/329 |
| 2016/0173239 A1* | 6/2016 | Kim | H04L 1/1812 |
| | | | 370/329 |
| 2016/0192420 A1* | 6/2016 | Kim | H04W 74/00 |
| | | | 370/329 |
| 2016/0255489 A1* | 9/2016 | Seo | H04B 7/2656 |
| | | | 370/329 |
| 2016/0255615 A1* | 9/2016 | Chatterjee | H04W 36/0055 |
| | | | 370/330 |
| 2016/0278003 A1* | 9/2016 | Kim | H04W 48/16 |
| 2016/0295430 A1* | 10/2016 | Jung | H04W 24/04 |
| 2016/0309430 A1* | 10/2016 | Chae | H04W 56/0025 |

* cited by examiner

APPARATUS AND METHOD FOR AVOIDING COLLISION BETWEEN RANDOM ACCESS TRANSMISSION AND DEVICE TO DEVICE TRANSMISSION IN COMMUNICATION SYSTEM SUPPORTING DEVICE TO DEVICE SCHEME

CROSS-REFERENCE TO RELATED APPLICATION(S)

This application claims the benefit under 35 U.S.C. § 119(a) of an Indian patent application filed on Jan. 22, 2014 in the Indian Intellectual Property Office and assigned Serial number IN96/KOL/2014, and an Indian patent application filed on Jul. 11, 2014 in the Indian Intellectual Property Office and assigned Serial number IN753/KOL/2014, the entire disclosure of each of which is hereby incorporated by reference.

TECHNICAL FIELD

The present disclosure relates to an apparatus and method for avoiding a collision between a random access transmission and a device to device (D2D) transmission in a communication system supporting a D2D scheme.

BACKGROUND

A device to device (D2D) discovery process is a process of determining whether a D2D-enabled user equipment (UE) is in proximity of other D2D-enabled UE. A discovering D2D-enabled UE determines whether another D2D-enabled UE is of interest to the discovering D2D-enabled UE based on the D2D discovery process. The other D2D-enabled UE is of interest to the discovering D2D-enabled UE if proximity of the other D2D-enabled UE needs to be known by one or more authorized applications on the discovering D2D-enabled UE. For example, a social networking application may be enabled to use a D2D discovery feature. The D2D discovery process enables a D2D-enabled UE of a given user of a social networking application to discover D2D-enabled UEs of friends of the given user of the social networking application, or to be discoverable by the D2D-enabled UEs of the friends of the given user of the social networking application. In another example, the D2D discovery process may enable the D2D-enabled UE of a given user of a search application to discover stores/restaurants, and the like, of interest of the D2D-enabled UE of the given user of the search application in proximity of the D2D-enabled UE of the given user of the search application.

A radio spectrum or radio frequency used for D2D communication is identical to a radio spectrum or radio frequency used for general communication between a UE and base station (BS). For example, in a frequency division duplex (FDD) system, a D2D transmission and a transmission from a UE to a BS may be configured on an uplink (UL) frequency. Radio resources for a D2D transmission are allocated or reserved on the UL frequency. In a time division duplex (TDD) system, radio resources, i.e., UL radio frames are reserved for a D2D transmission.

One issue of coexistence of a D2D transmission and a transmission from a UE to a BS in UL resources is collision between transmissions related to a random access and D2D transmissions.

For communication, a wireless link is divided into time slots, i.e., radio frames. Length of each radio frame may be 10 ms. Each radio frame is further divided into 10 sub-frames, and a length of each sub-frame may be 1ms. A sub-frame is a minimum unit for transmitting a data packet, and is called a transmit time interval (TTI).

A random access operation in a communication system supporting a D2D scheme according to the related art will be described with reference to FIG. 1.

FIG. 1 schematically illustrates a random access operation in a communication system supporting a D2D scheme according to the related art.

Referring to FIG. 1, during a random access, a UE selects a sub-frame based on physical random access channel (PRACH) resource configuration, and transmits a PRACH preamble, i.e., a message MSG 1 in a sub-frame x. Here, the PRACH resource configuration is broadcasted by a BS. After transmitting the PRACH preamble in the sub-frame x, the UE waits for a random access response (RAR) from the BS within a RAR window which starts after 3 sub-frames that follow the sub-frame x. For example, the RAR window may be set to an interval including up to 10 sub-frames. The RAR will be called a message MSG 2. The BS transmits the RAR in a sub-frame n within the RAR window. The UE receives the RAR in the sub-frame n within the RAR window, and transmits a message MSG 3 in a sub-frame n+6. Here, RAR window configuration for the RAR window size is broadcasted by the BS. For example, the RAR window configuration includes information on a size of the RAR window.

A random access operation in a communication system supporting a D2D scheme according to the related art has been described with reference to FIG. 1, and D2D resource configuration in a communication system supporting a D2D scheme according to the related art will be described with reference to FIG. 2.

FIG. 2 schematically illustrates D2D resource configuration in a communication system supporting a D2D scheme according to the related art.

Referring to FIG. 2, a resource for a PRACH, i.e., a PRACH resource may be included in all sub-frames included in every radio frame.

Alternatively, the PRACH resource may be included in a specific sub-frame which is included in specific radio frames, e.g., even numbered radio frames.

Alternatively, the PRACH resource may be included in a specific sub-frame which is included in every radio frame.

Meanwhile, resources for a D2D transmission, i.e., D2D sub-frames are periodically configured. For example, as illustrated in FIG. 2, 32 sub-frames are allocated for a D2D transmission every 1 second. Here, a resource for a D2D scheme will be called a D2D resource, a period by which the D2D resource is configured will be called a D2D resource cycle, and duration which is occupied by the D2D resource will be called D2D resource duration.

Meanwhile, periodic D2D resource configuration is associated with two main issues which are related to a PRACH collision.

The first issue is that a preamble transmission through a PRACH resource may collide with D2D transmissions.

The second issue is that an MSG 3 transmission in a sub-frame may collide with a D2D transmission.

That is, a D2D transmission will collide with a random access transmission. The random access transmission may include a preamble transmission through a PRACH resource or an MSG 3 transmission.

So, there is a need for avoiding a collision between a D2D transmission and a random access transmission in a communication system supporting a D2D scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for avoiding a collision between a device to device (D2D) transmission and a random access transmission in a communication system supporting a D2D scheme.

Another aspect of the present disclosure is to provide an apparatus and method for avoiding a collision between a D2D transmission and a random access transmission based on a type of a resource in a communication system supporting a D2D scheme.

Another aspect of the present disclosure is to provide an apparatus and method for avoiding a collision between a D2D transmission and a random access transmission by considering a physical random access channel (PRACH) preamble collision in a communication system supporting a D2D scheme.

Another aspect of the present disclosure is to provide an apparatus and method for avoiding a collision between a D2D transmission and a random access transmission by considering an in-band emission in a communication system supporting a D2D scheme.

Another aspect of the present disclosure is to provide an apparatus and method for avoiding a collision between a D2D transmission and a random access transmission by considering a guard band for an in-band emission in a communication system supporting a D2D scheme.

Another aspect of the present disclosure is to provide an apparatus and method for avoiding a collision between a D2D transmission and a random access transmission by considering power control for an in-band emission in a communication system supporting a D2D scheme.

Another aspect of the present disclosure is to provide an apparatus and method for avoiding a collision between a D2D transmission and a random access transmission by considering a message 3 (MSG 3) collision in a communication system supporting a D2D scheme.

Another aspect of the present disclosure is to provide an apparatus and method for avoiding a collision between a D2D transmission and a random access transmission based on a priority for the D2D transmission and a priority for the random access transmission in a communication system supporting a D2D scheme.

Another aspect of the present disclosure is to provide an apparatus and method for avoiding a collision between a D2D transmission and a random access transmission based on a priority for a D2D reception and a priority for the random access transmission in a communication system supporting a D2D scheme.

In accordance with an aspect of the present disclosure, a method for avoiding a collision between a D2D transmission and a random access transmission by a user equipment (UE) in a communication system supporting a D2D scheme is provided. The method includes detecting resource configuration information related to a random access transmission and resource configuration information related to a D2D transmission, determining a result based on whether a resource, in which a D2D resource which corresponds to the resource configuration information related to the D2D transmission is included, includes a random access resource which corresponds to the resource configuration information related to the random access transmission, and avoiding using the resource or the random access resource for the D2D transmission based on the determined result.

In accordance with another aspect of the present disclosure, a method for avoiding a collision between a D2D transmission and a random access transmission by a base station (BS) in a communication system supporting a D2D scheme is provided. The method includes configuring resources so that some resources include a resource related to a random access transmission and other resources which do not include the resource related to the random access transmission include a resource related to a D2D transmission, and transmitting resource configuration information related to the random access transmission and resource configuration information related to the D2D transmission to a UE.

In accordance with another aspect of the present disclosure, a UE in a communication system supporting a D2D scheme is provided. The UE includes a controller configured to detect resource configuration information related to a random access transmission and resource configuration information related to a D2D transmission, determine a result based on whether a resource, in which a D2D resource which corresponds to the resource configuration information related to the D2D transmission is included, includes a random access resource which corresponds to the resource configuration information related to the random access transmission, and avoid using the resource or the random access resource for the D2D transmission based on the determined result.

In accordance with another aspect of the present disclosure, a BS in a communication system supporting a D2D scheme is provided. The BS includes a controller configured to configure resources so that some resources include a resource related to a random access transmission and other resources which do not include the resource related to the random access transmission include a resource related to a D2D transmission, and a transmitter configured to transmit resource configuration information related to the random access transmission and resource configuration information related to the D2D transmission to a UE.

Other aspects, advantages, and salient features of the disclosure will become apparent to those skilled in the art from the following detailed description, which, taken in conjunction with the annexed drawings, discloses various embodiments of the present disclosure.

Before the detailed description provided below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
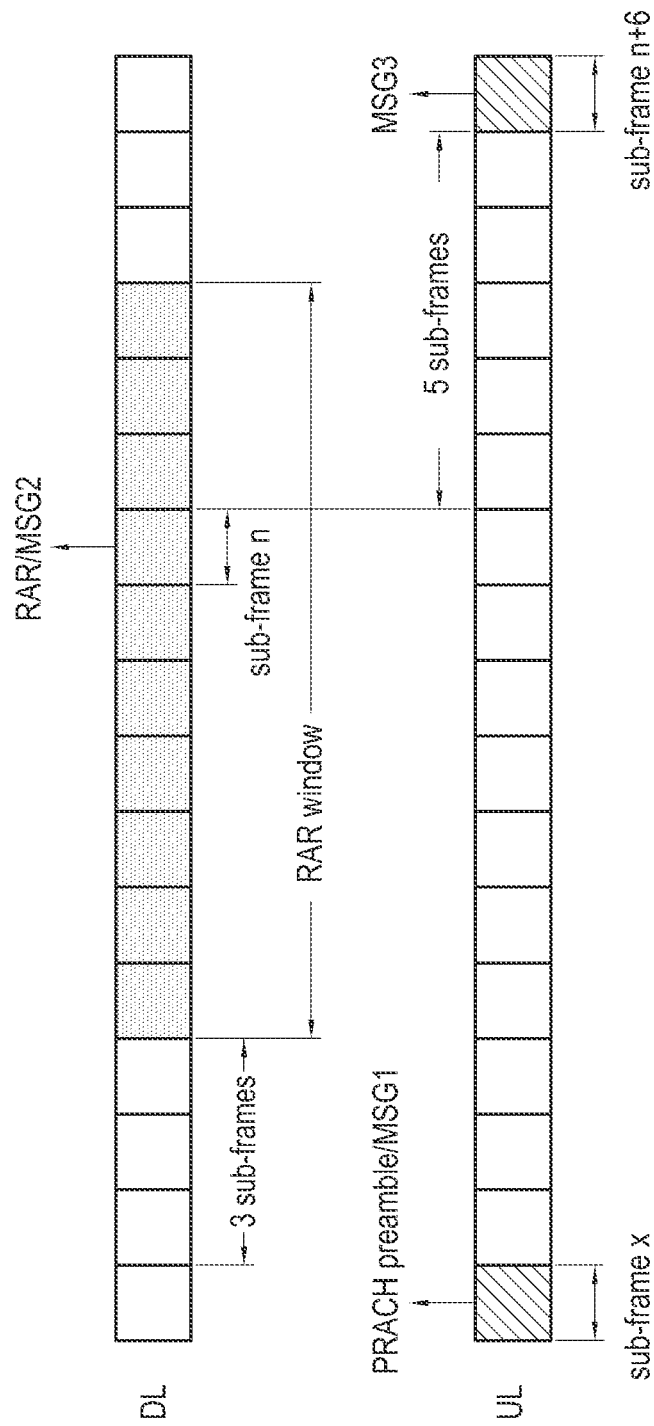
FIG. 1 schematically illustrates a random access operation in a communication system supporting a device to device (D2D) scheme according to the related art.
Figure 2:
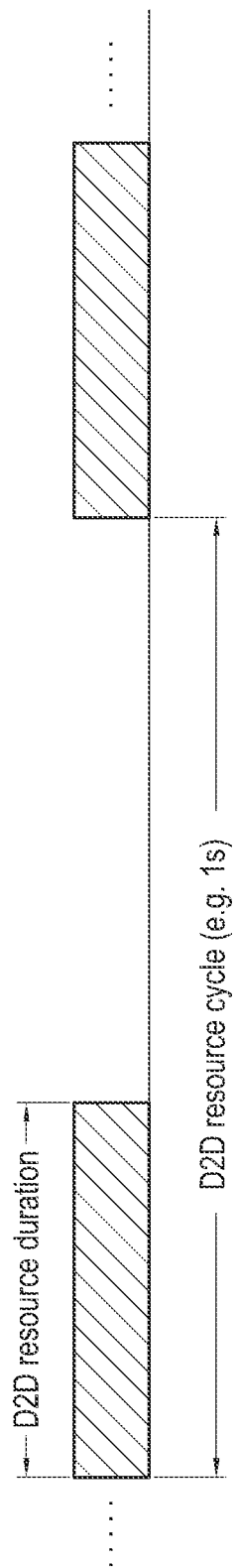
FIG. 2 schematically illustrates D2D resource configuration in a communication system supporting a D2D scheme according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a user equipment (UE) may be an electronic device.

An embodiment of the present disclosure proposes an apparatus and method for avoiding a collision between a device to device (D2D) transmission and a random access transmission in a communication system supporting a D2D scheme. The random access transmission may include a preamble transmission or through a physical random access channel (PRACH) resource a message MSG 3, which may also be referred to as a MSG 3, transmission.

An embodiment of the present disclosure proposes an apparatus and method for avoiding a collision between a D2D transmission and a random access transmission based on a type of a resource in a communication system supporting a D2D scheme.

An embodiment of the present disclosure proposes an apparatus and method for avoiding a collision between a D2D transmission and a random access transmission by considering a PRACH preamble collision in a communication system supporting a D2D scheme.

An embodiment of the present disclosure proposes an apparatus and method for avoiding a collision between a D2D transmission and a random access transmission by considering an in-band emission in a communication system supporting a D2D scheme.

An embodiment of the present disclosure proposes an apparatus and method for a collision between a D2D transmission and a random access transmission by considering a guard band for an in-band emission in a communication system supporting a D2D scheme.

An embodiment of the present disclosure proposes an apparatus and method for avoiding a collision between a D2D transmission and a random access transmission by considering power control for an in-band emission in a communication system supporting a D2D scheme.

An embodiment of the present disclosure proposes an apparatus and method for avoiding a collision between a D2D transmission and a random access transmission by considering an MSG 3 collision in a communication system supporting a D2D scheme.

An embodiment of the present disclosure proposes an apparatus and method for avoiding a collision between a D2D transmission and a random access transmission based on a priority for the D2D transmission and a priority for the random access transmission in a communication system supporting a D2D scheme.

An embodiment of the present disclosure proposes an apparatus and method for avoiding a collision between a D2D transmission and a random access transmission based on a priority for a D2D reception and a priority for the random access transmission in a communication system supporting a D2D scheme.

A method and apparatus proposed in an embodiment of the present disclosure may be applied to various communication systems such as an Institute of Electrical and Electronics Engineers (IEEE) 802.11ac communication system, an IEEE 802.16 communication system, a digital video broadcasting system such as a mobile broadcasting service such as a digital multimedia broadcasting (DMB) service, a digital video broadcasting-handheld (DVP-H) service, an Advanced Television Systems Committee-mobile/handheld (ATSC-M/H) service, and the like, and an internet protocol television (IPTV) service, a Moving Picture Experts Group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an IEEE mobile communication system, a mobile internet protocol (Mobile IP) system, and/or the like.

In a communication system supporting a D2D scheme according to an embodiment of the present disclosure, schemes for handling a PRACH preamble collision, i.e., a PRACH preamble collision handling scheme #1, a PRACH preamble collision handling scheme #2, and a PRACH preamble collision handling scheme #3 will be described below.

Firstly, a PRACH preamble collision handling scheme #1 in a communication system supporting a D2D scheme according to an embodiment of the present disclosure will be described with reference to FIG. 3.

Figure 3:
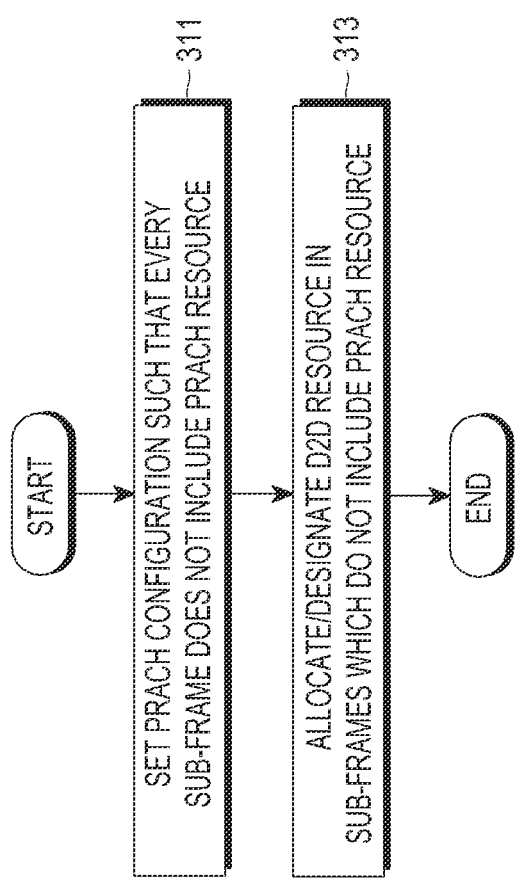
FIG. 3 schematically illustrates a physical random access channel (PRACH) preamble collision handling scheme #1 in a communication system supporting a D2D scheme according to an embodiment of the present disclosure.

FIG. 3 schematically illustrates a PRACH preamble collision handling scheme #1 in a communication system supporting a D2D scheme according to an embodiment of the present disclosure.

Referring to FIG. 3, a base station (BS) does not allocate and/or designate a resource for a D2D scheme, i.e., a sub-frame if the sub-frame includes a PRACH resource. The PRACH resource denotes a resource for a PRACH, and a resource for the D2D scheme will be called a D2D resource.

The BS transmits information for configured PRACH resources, i.e., PRACH resource allocation information. In an LTE system, the PRACH resource allocation information is transmitted through a PRACH-ConfigIndex. For example, if a value of the PRACH-ConfigIndex is set to 14, then a PRACH resource exists in every sub-frame. So, if the PRACH resource exists in some sub-frames rather than all sub-frames, the BS does not need to set the value of the PRACH-ConfigIndex to 14.

A BS sets PRACH configuration such that every sub-frame does not include a PRACH resource, that is, only specific sub-frames include a PRACH resource at operation 311. The BS allocates/designates a D2D resource, i.e., a D2D sub-frame in sub-frames which do not include a PRACH resource at operation 313.

Although FIG. 3 illustrates a PRACH preamble collision handling scheme #1 in a communication system supporting a D2D scheme according to an embodiment of the present disclosure, various changes could be made to FIG. 3. For example, although shown as a series of operations, various operations in FIG. 3 could overlap, occur in parallel, occur in a different order, or occur multiple times.

A PRACH preamble collision handling scheme #1 in a communication system supporting a D2D scheme according to an embodiment of the present disclosure has been described with reference to FIG. 3, and D2D resource duration which is based on a PRACH preamble collision handling scheme #1 in a communication system supporting a D2D scheme according to an embodiment of the present disclosure will be described with reference to FIG. 4.

Figure 4:
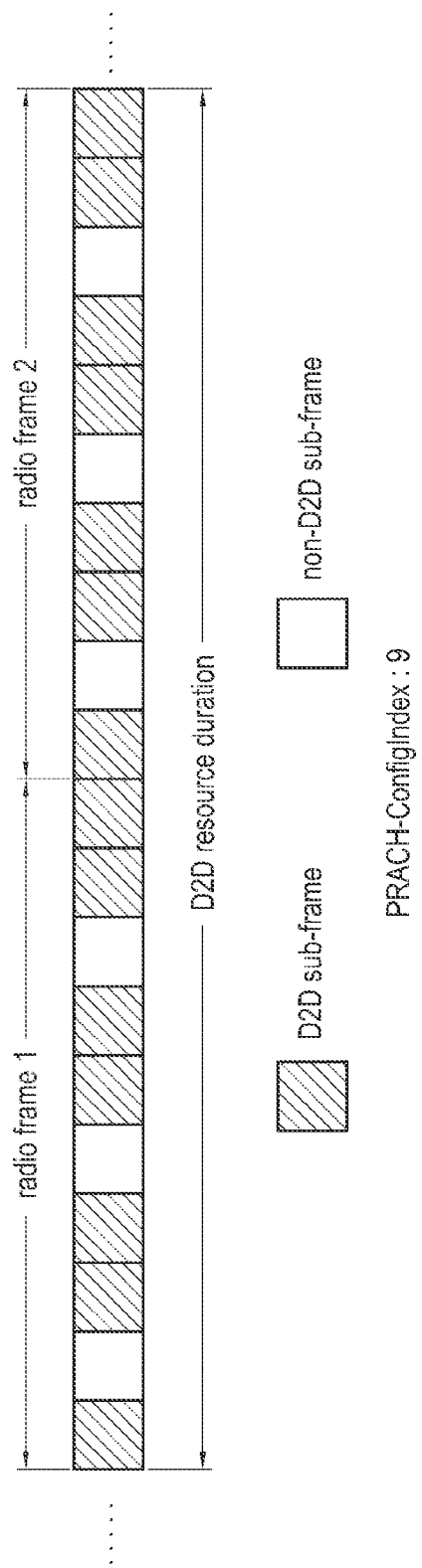
FIG. 4 schematically illustrates D2D resource duration which is based on a PRACH preamble collision handling scheme #1 in a communication system supporting a D2D scheme according to an embodiment of the present disclosure.

FIG. 4 schematically illustrates D2D resource duration which is based on a PRACH preamble collision handling scheme #1 in a communication system supporting a D2D scheme according to an embodiment of the present disclosure.

Referring to FIG. 4, if a D2D resource is allocated based on PRACH configuration, specific sub-frames included in D2D resource duration are configured as non-D2D sub-frames. Here, a non-D2D sub-frame denotes a sub-frame which is not used for a D2D scheme.

D2D resource duration in FIG. 4 indicates D2D resource duration in a case in which a value of a PRACH-ConfigIndex is set to 9. If the value of the PRACH-ConfigIndex is set to 9, a sub-frame 1, a sub-frame 4, and a sub-frame 7 include a PRACH resource in every radio frame. So, during the D2D resource duration, the sub-frame 1, the sub-frame 4, and the sub-frame 7 are not used by a UE which supports a D2D scheme, i.e., a D2D UE for a D2D transmission. Each of the sub-frame 1, the sub-frame 4, and the sub-frame 7 becomes a non D2D sub-frame, and information on the non D2D sub-frames is signaled to D2D UEs.

D2D resource duration, which is based on a PRACH preamble collision handling scheme #1 in a communication system supporting a D2D scheme according to an embodiment of the present disclosure, has been described with reference to FIG. 4, and a PRACH preamble collision handling scheme #2 in a communication system supporting a D2D scheme according to an embodiment of the present disclosure will be described with reference to FIG. 5.

Figure 5:
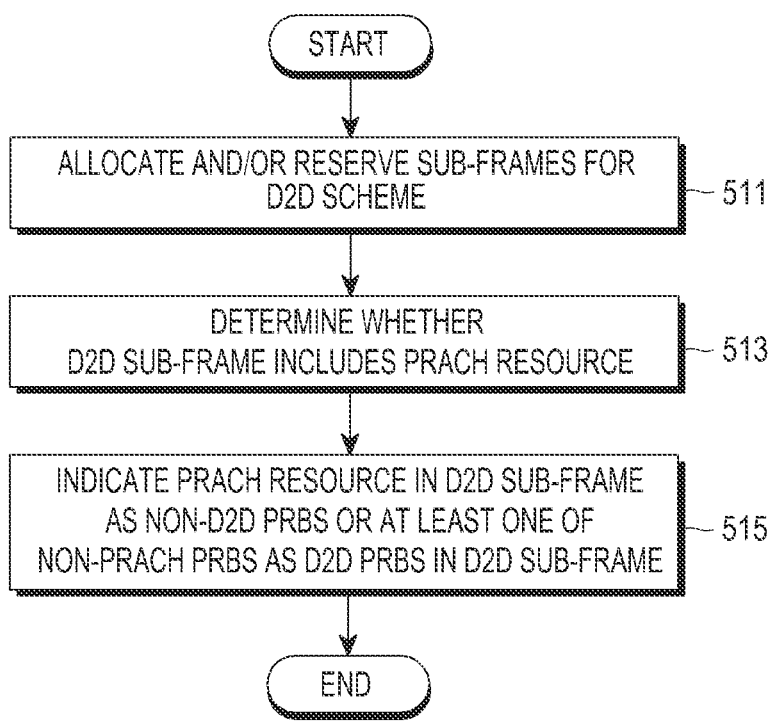
FIG. 5 schematically illustrates a PRACH preamble collision handling scheme #2 in a communication system supporting a D2D scheme according to an embodiment of the present disclosure.

FIG. 5 schematically illustrates a PRACH preamble collision handling scheme #2 in a communication system supporting a D2D scheme according to an embodiment of the present disclosure.

Referring to FIG. 5, if a D2D sub-frame includes a PRACH resource, a BS needs to indicate through D2D resource configuration that resources, i.e., physical radio blocks (PRBs), corresponding to a PRACH resource in the D2D sub-frame are non-D2D PRBs.

Alternatively, one or more non PRACH PRBs in a D2D sub-frame are indicated as D2D PRBs.

Meanwhile, a BS allocates and/or reserves sub-frames for a D2D scheme at operation 511. The BS determines whether a D2D sub-frame includes a PRACH resource at operation 513. The BS indicates a PRACH resource in a D2D sub-frame as non-D2D PRBs or at least one of non-PRACH PRBs as D2D PRBs in a D2D sub-frame based on the determining result at operation 515. That is, in a case in which the D2D sub-frame includes a PRACH resource, the BS indicates the PRACH resource in D2D sub-frame (SF) as non-D2D PRBs or the BS indicates one or more of non-PRACH PRBs as D2D PRBs in D2D SF.

Although FIG. 5 illustrates a PRACH preamble collision handling scheme #2 in a communication system supporting a D2D scheme according to an embodiment of the present disclosure, various changes could be made to FIG. 5. For example, although shown as a series of operations, various operations in FIG. 5 could overlap, occur in parallel, occur in a different order, or occur multiple times.

A PRACH preamble collision handling scheme #2 in a communication system supporting a D2D scheme according to an embodiment of the present disclosure has been described with reference to FIG. 5, and a D2D resource duration which is based on a PRACH preamble collision handling scheme #2 in a communication system supporting a D2D scheme according to an embodiment of the present disclosure will be described with reference to FIG. 6.

Figure 6:
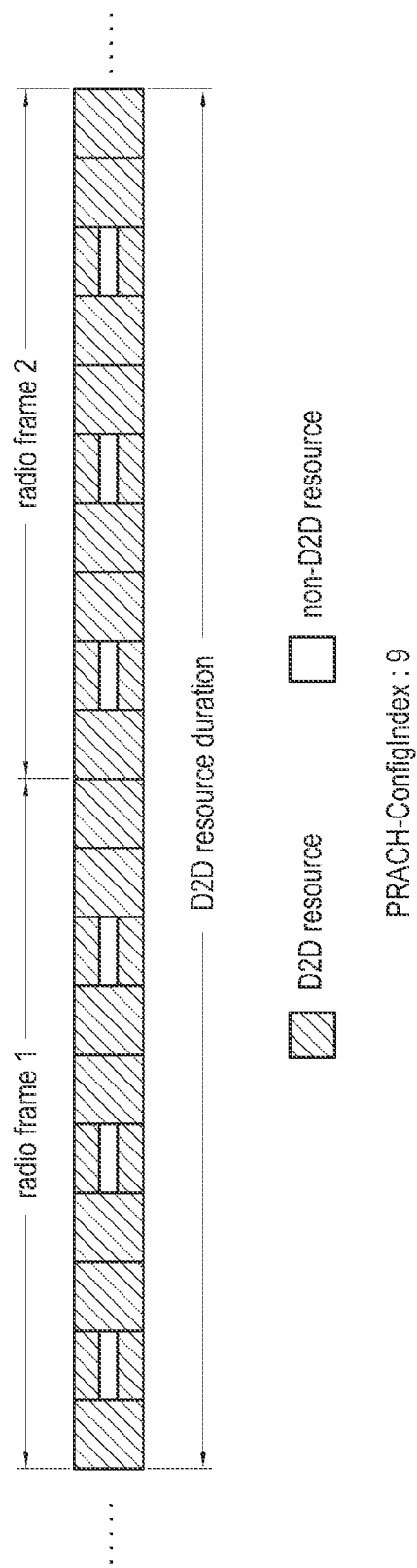
FIG. 6 schematically illustrates D2D resource duration which is based on a PRACH preamble collision handling scheme #2 in a communication system supporting a D2D scheme according to an embodiment of the present disclosure.

FIG. 6 schematically illustrates D2D resource duration which is based on a PRACH preamble collision handling scheme #2 in a communication system supporting a D2D scheme according to an embodiment of the present disclosure.

Referring to FIG. 6, D2D resource duration in FIG. 6 indicates D2D resource duration in a case in which a value of a PRACH-ConfigIndex is set to 9. If the value of the PRACH-ConfigIndex is set to 9, a sub-frame 1, a sub-frame 4, and a sub-frame 7 include a PRACH resource in every radio frame. So, in the sub-frame 1, the sub-frame 4, and the sub-frame 7, PRACH PRBs are indicated as non-D2D resources for D2D UEs by a BS.

D2D resource duration, which is based on a PRACH preamble collision handling scheme #2 in a communication system supporting a D2D scheme according to an embodiment of the present disclosure, has been described with reference to FIG. 6, and a PRACH preamble collision handling scheme #3 in a communication system supporting a D2D scheme according to an embodiment of the present disclosure will be described with reference to FIG. 7.

Figure 7:
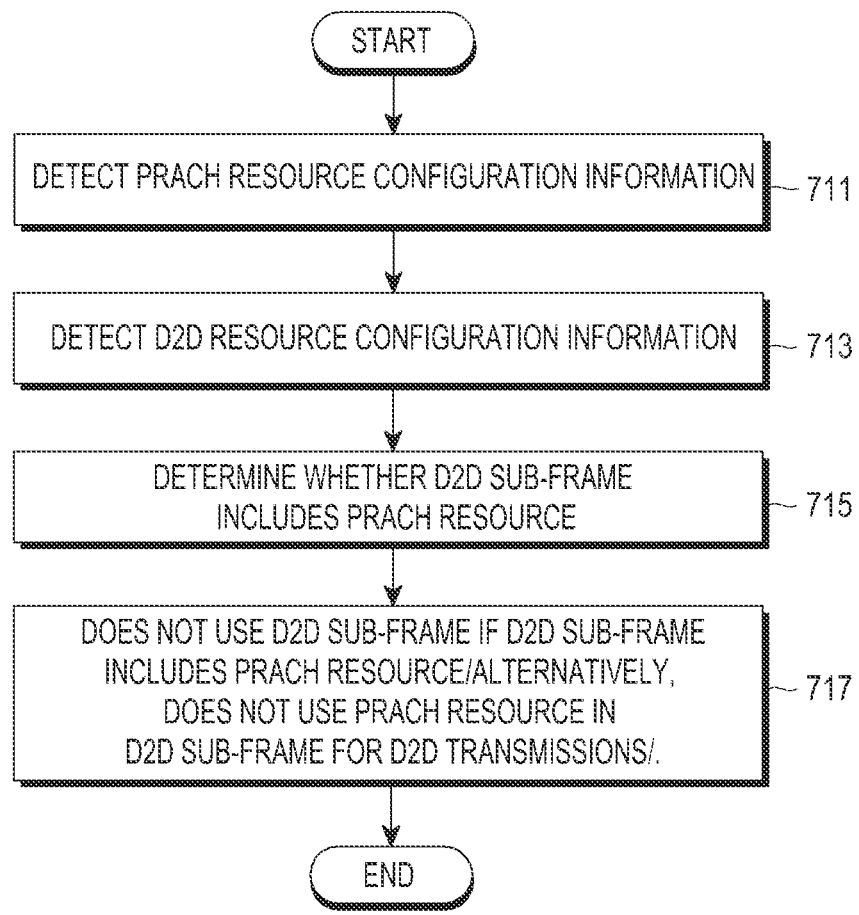
FIG. 7 schematically illustrates a PRACH preamble collision handling scheme #3 in a communication system supporting a D2D scheme according to an embodiment of the present disclosure.

FIG. 7 schematically illustrates a PRACH preamble collision handling scheme #3 in a communication system supporting a D2D scheme according to an embodiment of the present disclosure.

Referring to FIG. 7, a D2D transmitting (TX) UE detects PRACH resource configuration information signalled by a BS at operation 711. For example, if the communication system is an LTE mobile communication system, the D2D TX UE detects the PRACH resource configuration information by receiving a system information block 2 (SIB2) signalled by the BS. The D2D TX UE detects D2D resource configuration information signalled by the BS at operation 713. The D2D TX UE determines whether a D2D sub-frame includes a PRACH resource at operation 715.

The D2D TX UE does not use the D2D sub-frame if the D2D sub-frame includes the PRACH resource at operation 717. Alternatively, the D2D TX UE does not use the PRACH resource in a D2D sub-frame for D2D transmissions, and this will be described below.

For example, if a specific sub-frame is configured for a D2D scheme based on D2D resource configuration information, and also includes a PRACH resource based on PRACH resource configuration information, e.g., a PRACH-ConfigIndex and a PRACH-Mask, then the D2D TX UE does not perform a D2D transmitting operation in PRBs which correspond to PRACH PRBs in the specific sub-frame.

Alternatively, if a specific sub-frame is configured for a D2D scheme based on D2D resource configuration information and also includes a PRACH resource based on PRACH resource configuration information, e.g., a PRACH-ConfigIndex and a PRACH-Mask, then the D2D TX UE does not perform a D2D transmitting operation in this specific sub-frame.

In this case, a D2D receiving (RX) UE may also optimize an operation of the D2D RX UE by skipping a D2D sub-frame including a PRACH resource for receiving D2D transmissions.

Although FIG. 7 illustrates a PRACH preamble collision handling scheme #3 in a communication system supporting a D2D scheme according to an embodiment of the present disclosure, various changes could be made to FIG. 7. For example, although shown as a series of operations, various operations in FIG. 7 could overlap, occur in parallel, occur in a different order, or occur multiple times.

A PRACH preamble collision handling scheme #3, in a communication system supporting a D2D scheme according to an embodiment of the present disclosure, has been described with reference to FIG. 7, and D2D resource duration which is based on a PRACH preamble collision handling scheme #3 in a communication system supporting a D2D scheme according to an embodiment of the present disclosure will be described with reference to FIG. 8.

Figure 8:
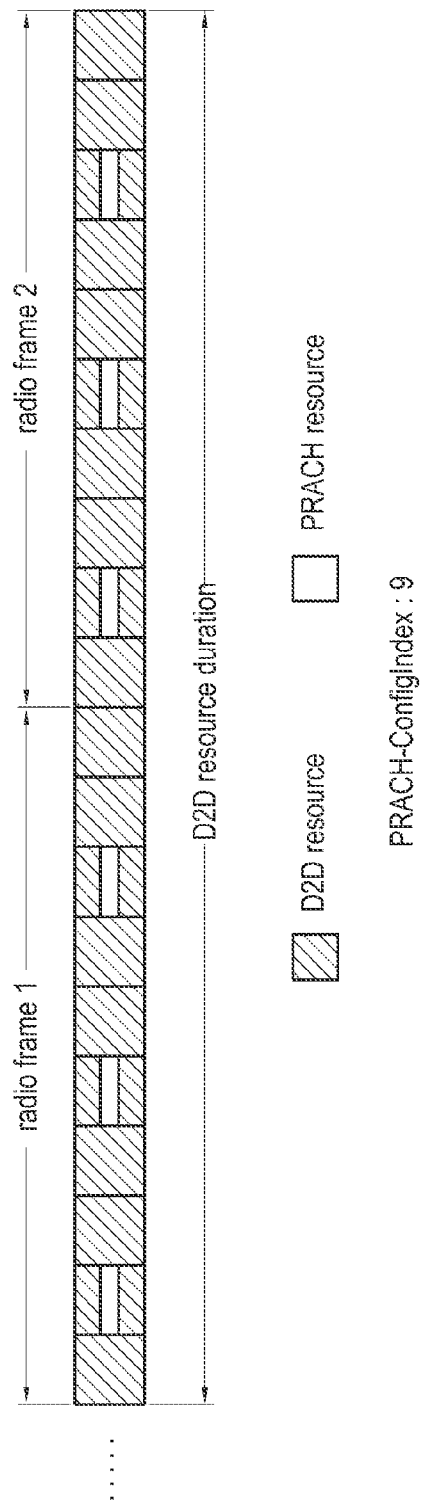
FIG. 8 schematically illustrates D2D resource duration which is based on a PRACH preamble collision handling scheme #3 in a communication system supporting a D2D scheme according to an embodiment of the present disclosure.

FIG. 8 schematically illustrates D2D resource duration which is based on a PRACH preamble collision handling scheme #3 in a communication system supporting a D2D scheme according to an embodiment of the present disclosure.

Referring to FIG. 8, a D2D resource duration in FIG. 8 indicates a D2D resource duration in a case in which a value of a PRACH-ConfigIndex is set to 9. If the value of the PRACH-ConfigIndex is set to 9, a sub-frame 1, a sub-frame 4, and a sub-frame 7 include a PRACH resource in every radio frame. So, in the sub-frame 1, the sub-frame 4, and the sub-frame 7, a D2D TX UE does not perform a transmitting operation through PRACH PRBs. A PRACH-Mask indicates which PRBs are for a PRACH.

Schemes of handing a PRACH preamble collision in a communication system supporting a D2D scheme according to an embodiment of the present disclosure have been described above, and schemes of handing an in-band emission in a communication system supporting a D2D scheme according to an embodiment of the present disclosure will be described below.

In the PRACH preamble collision handling scheme #1 and the PRACH preamble collision handling scheme #3, PRACH transmissions and D2D transmissions may coexist in the same sub-frame. The PRACH transmissions and the D2D transmissions use different PRBs. However, the D2D transmissions do not form a closed loop of which power is controlled like UE transmissions to a BS. So, the D2D transmissions lead to an in-band emission from the D2D transmissions which affect PRACH transmissions.

Schemes of handing an in-band emission will be described below.

Firstly, guard band handling schemes for in-band emissions, i.e., a guard band handling scheme #1 and a guard band handling scheme #2, will be described below.

A guard band is defined between D2D PRBs and PRBs for a PRACH in a sub-frame in order to avoid an in-band emission from D2D transmissions.

Firstly, a guard band handling scheme #1 will be described below.

A BS may determine certain PRBs which are before and after PRACH PRBs as non-D2D PRBs, and signal information for the non-D2D PRBs to D2D UEs. Alternatively, the BS may not determine the certain PRBs which are before and after the PRACH PRBS as D2D PRBs.

Secondly, a guard band handling scheme #2 will be described below.

A D2D TX UE does not perform a transmitting operation in certain PRBs which are before and after PRACH PRBs. The D2D TX UE determines PRACH PRBs by detecting PRACH resource configuration information signaled by a BS. Here, the number of PRBs which the D2D TX UE may skip may be pre-determined or configured by a network.

Secondly, power control schemes for in-band emissions, i.e., a power control scheme #1, a power control scheme #2, and a power control scheme #3, will be described below.

In a D2D sub-frame including PRACH PRBs, transmission power of a D2D TX UE through D2D PRBs is controlled.

Firstly, a power control scheme #1 will be described below.

A D2D TX UE performs a transmitting operation through D2D PRBs in a sub-frame including PRACH PRBs with reduced power. Only a subset of D2D PRBs is transmitted with reduced power in a sub-frame including PRACH PRBs. The subset of the D2D PRBs, e.g., PRBs which are before and after the PRACH PRBs, may be pre-determined or configured by a network or a BS. For example, the D2D TX UE performs a transmitting operation through D2D PRBs, which are determined in the sub-frame including the PRACH PRBs, i.e., all D2D PRBs, or a subset of D2D PRBs which are before and after PRACH PRBs in the sub-frame including the PRACH PRBs, with reduced power given by '$P_{D2D} - P_{Offset}$'. Here, the $P_{Offset}$ is pre-determined or configured by the network or the BS. The $P_{D2D}$ is power with which the D2D TX UE performs a normal transmitting operation, i.e., power which is used if the D2D TX UE does not need to handle an in-band emission.

Alternatively, the D2D TX UE performs a transmitting operation through D2D PRBs in the sub-frame including the PRACH PRBs, i.e., all D2D PRBs, or a subset of D2D PRBs which are before and after PRACH PRBs in the sub-frame including the PRACH PRBs, with reduced power given by '$P_{D2D\text{-}Reduce}$'. Here, the $P_{D2D\text{-}Reduced}$ is pre-determined or configured by the network or the BS.

Secondly, a power control scheme #2 will be described below.

A D2D TX UE performs a transmitting operation with power which is equal to power which is used for transmitting a related PRACH signal through D2D PRBs in a sub-frame including PRACH PRBs. The D2D TX UE needs to calculate PREAMBLE_RECEIVED_TARGET_POWER by setting a value of a PREAMBLE_TRANSMISSION_COUNTER to an arbitrary value, e.g., 1, i.e., by setting the value of the PREAMBLE_TRANSMISSION_COUNTER corresponding to the first transmission. The value of the PREAMBLE_TRANSMISSION_COUNTER may be set corresponding to the Nth transmission. Here, the Nth transmission may be pre-determined or set by a network or a BS.

Power of the D2D TX UE may be expressed as Equation (1):

$$P_{PRACH\_D2D} = \min \{P_{CMAX,c}, \text{PREAMBLE\_RECEIVED\_TARGET\_POWER} + PL_c\} \quad \text{Equation 1}$$

In Equation 1, $P_{CMAX,c}$ is a UE transmission power which is set for serving a cell c, and $PL_c$ is a downlink path loss estimation value which is detected in the D2D TX UE for serving the cell c.

The D2D TX UE performs a transmitting operation using power $P_{PRACH\_D2D}$ expressed as Equation 1. Here, a lower bound $P_{D2Dmin}$ may be defined, and the D2D TX UE does not perform a transmitting operation in D2D PRBs if $P_{PRACH\_D2D}$ is less than $P_{D2Dmin}$, that is, $P_{PRACH\_D2D} < P_{D2Dmin}$.

Alternatively, the D2D TX UE uses $P_{PRACH\_D2D}$ expressed as Equation 1 in order to determine $P_{D2D\text{-}Reduced}$, and this will be expressed as Equation 2:

$$P_{D2D\text{-}Reduced} = \min \{P_{D2D}, P_{PRACH\_D2D}\} \quad \text{Equation 2}$$

In Equation 2, $P_{D2D}$ denotes power which is used in a case in which the D2D TX UE performs a normal transmitting operation, i.e., power which is used in a case that the D2D TX UE does not need to handle the in-band emissions. Here, a lower bound $P_{D2Dmin}$ may be defined, and the D2D TX UE does not perform a transmitting operation in D2D PRBs if $P_{D2D\text{-}Reduced}$ is less than $P_{D2Dmin}$, that is, $P_{PRACH\_D2D} < P_{D2Dmin}$.

Alternatively, the D2D TX UE performs a transmitting operation only in a sub-set of D2D PRBs using the power control scheme #2. The sub-set of the D2D PRBs which are before and after the PRACH PRBs may be pre-determined or configured by a network or a BS.

The power control scheme #2 for controlling in-band emissions may be applied to other channels such as a physical uplink control channel (PUCCH) in addition to a PRACH.

Thirdly, a power control scheme #3 will be described below.

The power control scheme #3 is a power control scheme in which all of a guard band handling scheme #1 to a guard band handling scheme #3, the power control scheme #1, and the power control scheme #2 are applied. For example, a guard band is provided around PRACH PRBs included in a D2D sub-frame. D2D PRBs after the guard band, i.e., all D2D PRBs or a sub-set of the D2D PRBs, are power controlled using the power control scheme #1 and the power control scheme #2.

Schemes of handing an in-band emission in a communication system supporting a D2D scheme according to an embodiment of the present disclosure have been described above, and schemes of handing an MSG 3 collision, i.e., an MSG 3 collision handling scheme #1, an MSG 3 collision handling scheme #2, an MSG 3 collision handling scheme #3, an MSG 3 collision handling scheme #4, and an MSG 3 collision handling scheme #5 will be described below.

Firstly, an MSG 3 collision handling scheme #1 will be described below.

An MSG 3 collision handling scheme #1 in a communication system supporting a D2D scheme according to an embodiment of the present disclosure will be described with reference to FIG. 9.

Figure 9:
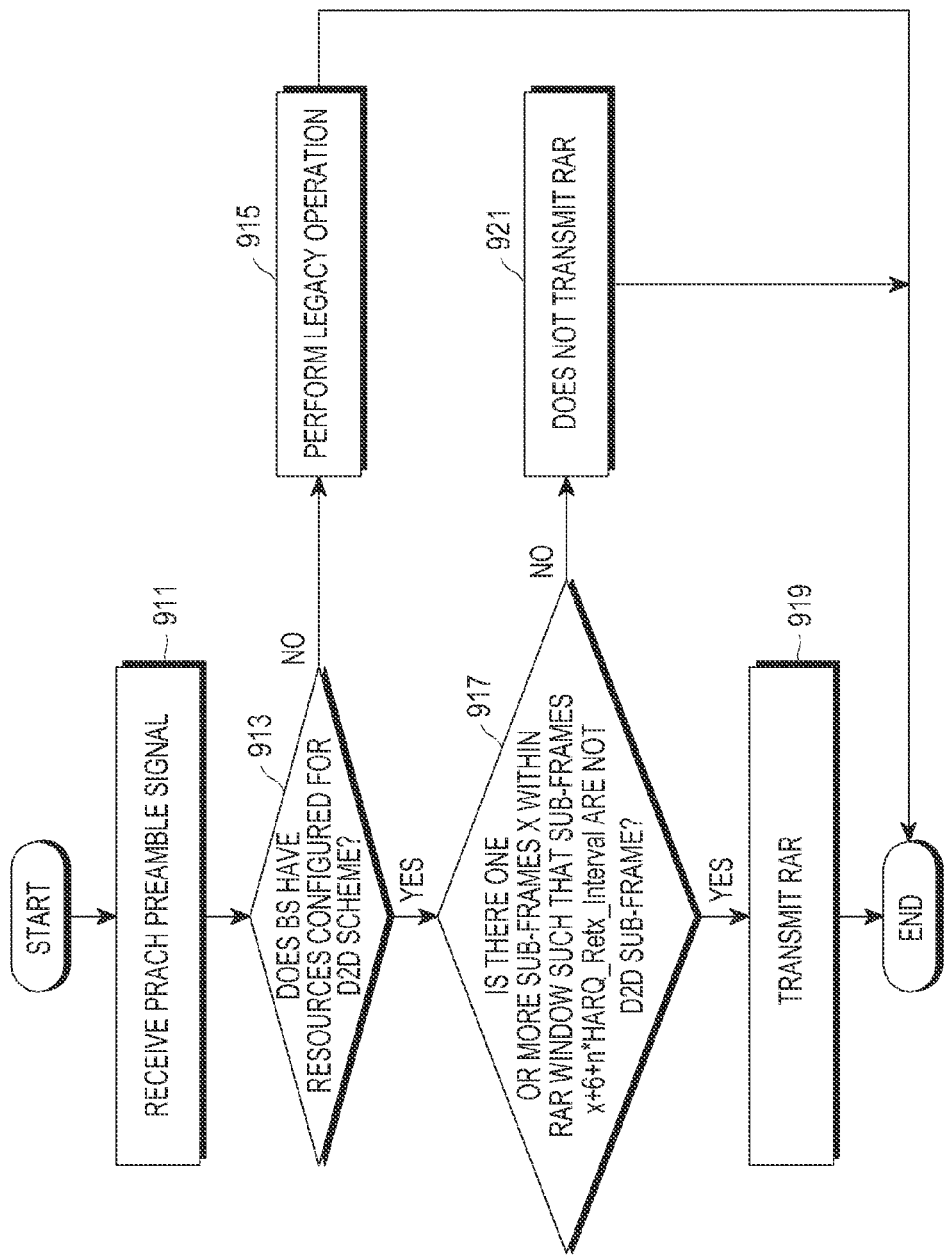
FIG. 9 schematically illustrates an message collision handling scheme #1 in a communication system supporting a D2D scheme according to an embodiment of the present disclosure.

FIG. 9 schematically illustrates an MSG 3 collision handling scheme #1 in a communication system supporting a D2D scheme according to an embodiment of the present disclosure.

Referring to FIG. 9, a BS selects a sub-frame for a random access response (RAR) transmission in order to avoid an MSG 3 collision based on a MSG 3 collision handling scheme #1. The BS receives a PRACH preamble signal from a UE at operation 911. The BS determines whether the BS has resources configured for a D2D scheme at 913. If the BS does not have the resources configured for the D2D scheme, the BS performs a legacy operation at operation 915. A detailed description for the legacy operation will be omitted herein.

If the BS has the resources configured for the D2D scheme, the BS determines whether there is one or more sub-frames x within a RAR window such that sub-frames x+6+n*HARQ_Retx Interval are not a D2D sub-frame at operation 917. Here, n is an integer which is from 0 to (a maximum number of MSG 3 transmissions−1), and the HARQ_Retx_Interval denotes a hybrid automatic repeat request (HARQ) retransmission interval. If there is the one or more sub-frames x within the RAR window such that the sub-frames x+6+n*HARQ_Retx_Interval are not the D2D sub-frame, the BS transmits a RAR in one of the one or more sub-frames x at operation 919.

If there is not the one or more sub-frames x within the RAR window such that the sub-frames x+6+n*HARQ_Retx_Interval are not the D2D sub-frame, the BS does not transmit a RAR at operation 921.

In this case, a UE will not receive a RAR, so the UE will retransmit a PRACH preamble signal.

Although FIG. 9 illustrates an MSG 3 collision handling scheme #1 in a communication system supporting a D2D scheme according to an embodiment of the present disclosure, various changes could be made to FIG. 9. For example, although shown as a series of operations, various operations in FIG. 9 could overlap, occur in parallel, occur in a different order, or occur multiple times.

An MSG 3 collision handling scheme #1 in a communication system supporting a D2D scheme according to an embodiment of the present disclosure has been described with reference to FIG. 9, and a process of determining a RAR sub-frame which is based on an MSG 3 collision handling scheme #1 in a case in which x is 5 in a communication system supporting a D2D scheme according to an embodiment of the present disclosure will be described with reference to FIG. 10.

Figure 10:
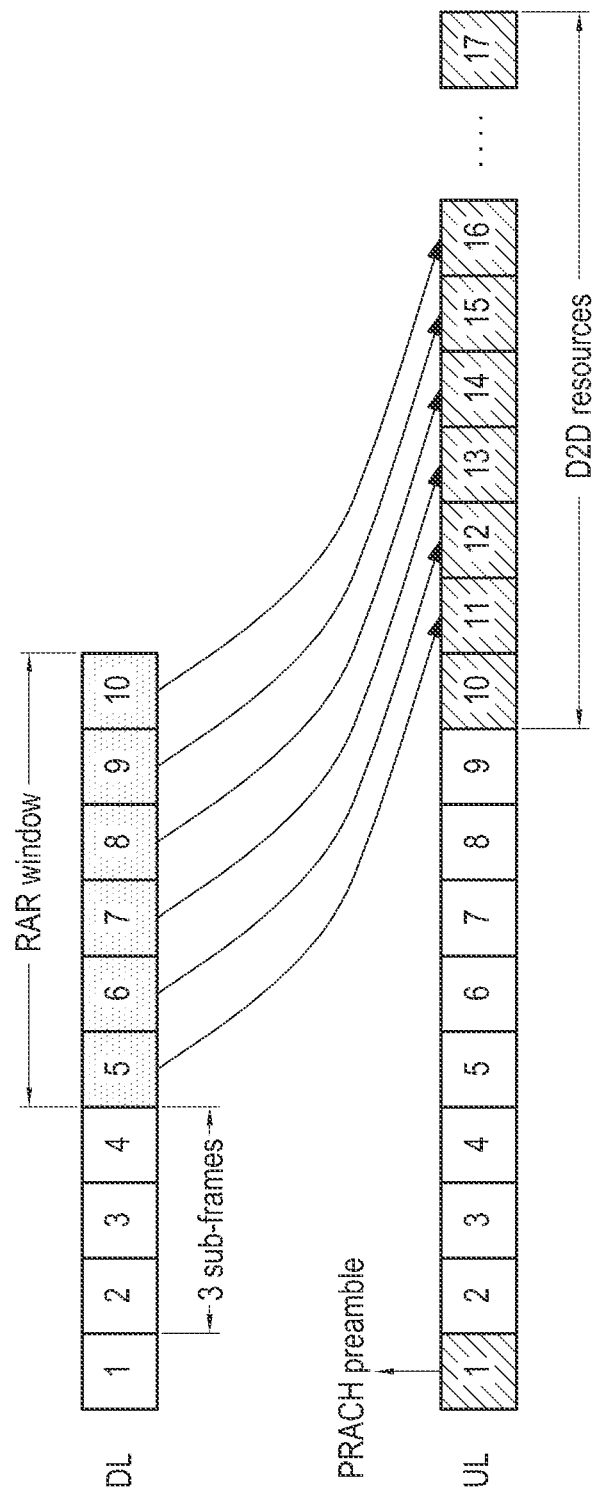
FIG. 10 schematically illustrates a process of determining a random access response (RAR) sub-frame which is based on a message collision handling scheme #1 in a case that x is 5 in a communication system supporting a D2D scheme according to an embodiment of the present disclosure.

FIG. 10 schematically illustrates a process of determining a RAR sub-frame which is based on an MSG 3 collision handling scheme #1 in a case in which x is 5 in a communication system supporting a D2D scheme according to an embodiment of the present disclosure.

Referring to FIG. 10, for a sub-frame 'x=5', a BS determines whether all sub-frames, i.e., sub-frames 5+6+0*8, 5+6+1*8, 5+6+2*8, and 5+6+3*8 are non-D2D sub-frames. If the sub-frames 5+6+0*8, 5+6+1*8, 5+6+2*8, and 5+6+3*8 are the non-D2D sub-frames, a sub-frame 5 is a candidate sub-frame for a RAR transmission. The same operation is performed for sub-frames 6 to 10.

In FIG. 10, an HARQ_Retx_Interval is set to an interval including 8 sub-frames, a RAR window size is set to an interval including 6 sub-frames, and a maximum number of MSG 3 transmissions is set to 4.

For every sub-frame x in the RAR window, a sub-frame x+6 is a D2D sub-frame, so the BS does not transmit a RAR for a PRACH preamble signal which is received in a sub-frame 1.

A process of determining a RAR sub-frame which is based on an MSG 3 collision handling scheme #1 in a case in which x is 5 in a communication system supporting a D2D scheme according to an embodiment of the present disclosure has been described with reference to FIG. 10, and an example of a process of determining a RAR sub-frame which is based on an MSG 3 collision handling scheme #1 in a case in which x is 7 in a communication system supporting a D2D scheme according to an embodiment of the present disclosure will be described with reference to FIG. 11.

Figure 11:
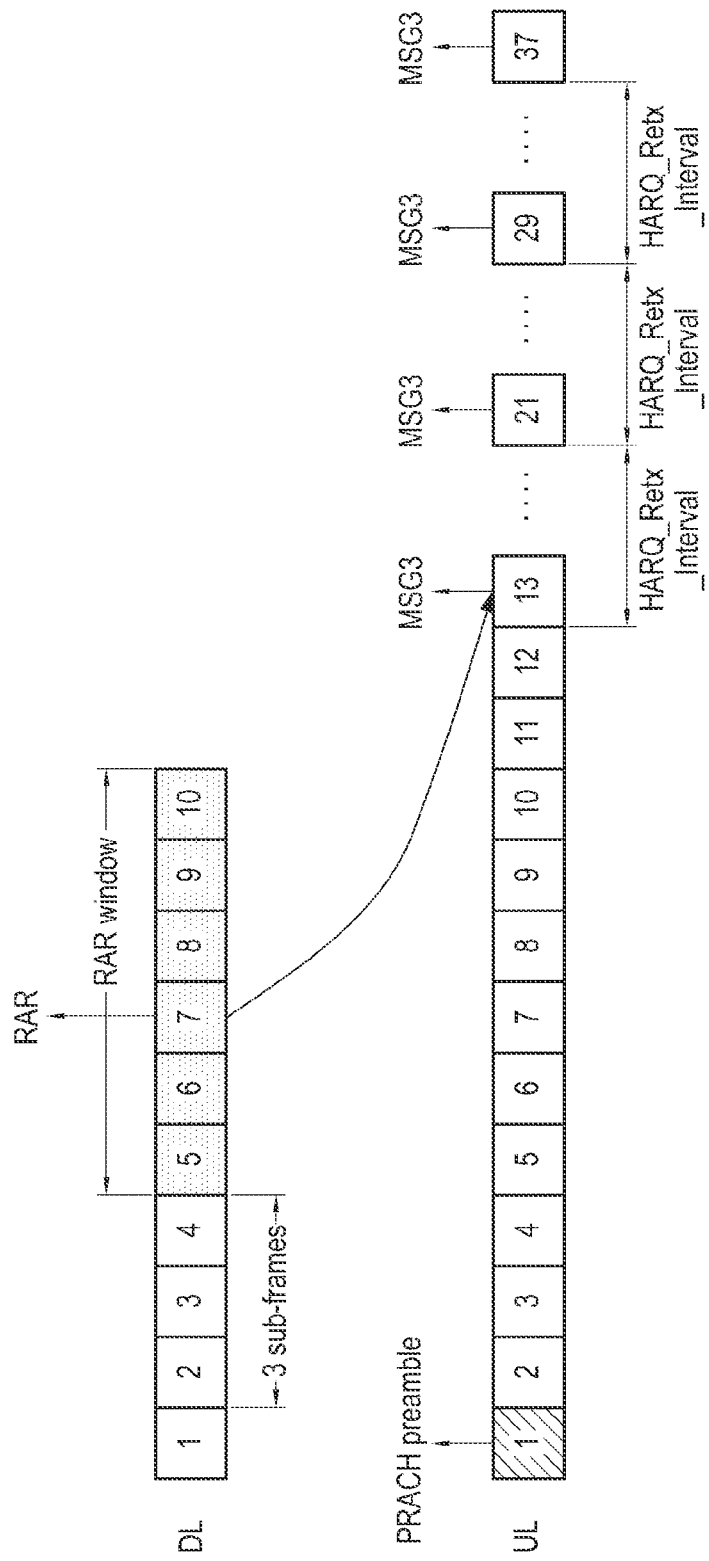
FIG. 11 schematically illustrates an example of a process of determining a RAR sub-frame which is based on a message collision handling scheme #1 in a case that x is 7 in a communication system supporting a D2D scheme according to an embodiment of the present disclosure.

FIG. 11 schematically illustrates an example of a process of determining a RAR sub-frame which is based on an MSG 3 collision handling scheme #1 in a case in which x is 7 in a communication system supporting a D2D scheme according to an embodiment of the present disclosure.

Referring to FIG. 11, for a sub-frame 'x=7' within a RAR window, sub-frames x+6+n*HARQ_Retx_Interval are non-D2D sub-frames. In FIG. 11, the HARQ_Retx_Interval is set to an interval including 8 sub-frames, a size of the RAR window is set to an interval including 6 sub-frames, and a maximum number of MSG 3 transmissions is set to 4. So, a BS transmits a RAR for a PRACH preamble received in a sub-frame 1 in a sub-frame 7.

An example of a process of determining a RAR sub-frame, which is based on an MSG 3 collision handling scheme #1 in a case in which x is 7 in a communication system supporting a D2D scheme according to an embodiment of the present disclosure, has been described with reference to FIG. 11, and another example of a process of determining a RAR sub-frame which is based on an MSG 3 collision handling scheme #1 in a case in which x is 7 in a communication system supporting a D2D scheme according to an embodiment of the present disclosure will be described with reference to FIG. 12.

Figure 12:
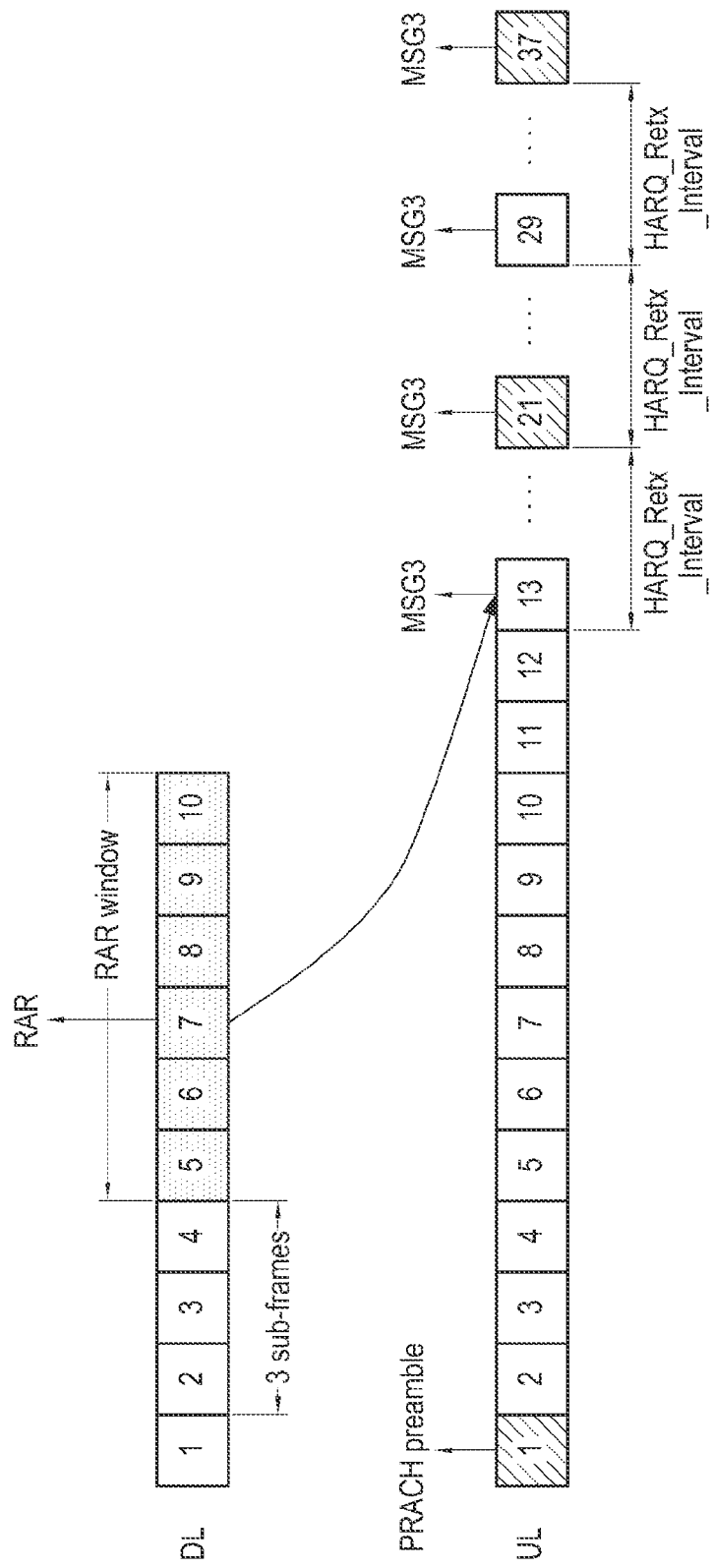
FIG. 12 schematically illustrates another example of a process of determining a RAR sub-frame which is based on a message collision handling scheme #1 in a case that x is 7 in a communication system supporting a D2D scheme according to an embodiment of the present disclosure.

FIG. 12 schematically illustrates another example of a process of determining a RAR sub-frame which is based on an MSG 3 collision handling scheme #1 in a case that x is 7 in a communication system supporting a D2D scheme according to an embodiment of the present disclosure.

Referring to FIG. 12, if some of sub-frames x+6+n*HARQ_Retx_Interval are not a D2D sub-frame, a BS may transmit a RAR. If the number of non D2D sub-frames corresponding to the x+6+n*HARQ_Retx_Interval is greater than or equal to a threshold number, the BS may transmit a RAR. As illustrated in FIG. 12, for a sub-frame 'x=7' within a RAR window, some sub-frames x+6+n*HARQ_Retx_Interval are non D2D sub-frames. In FIG. 12, the HARQ_Retx_Interval is set to an interval including 8 sub-frames, a size of the RAR window size is set to an interval including 6 sub-frames, a maximum number of MSG 3 transmissions is set to 4, and the threshold value is set to 2. So, the BS may transmit a RAR for a PRACH preamble which is received in a sub-frame 1 in a sub-frame 7.

Secondly, an MSG 3 collision handling scheme #2 will be described below.

An MSG 3 collision handling scheme #2 in a communication system supporting a D2D scheme according to an embodiment of the present disclosure will be described with reference to FIG. 13.

Figure 13:
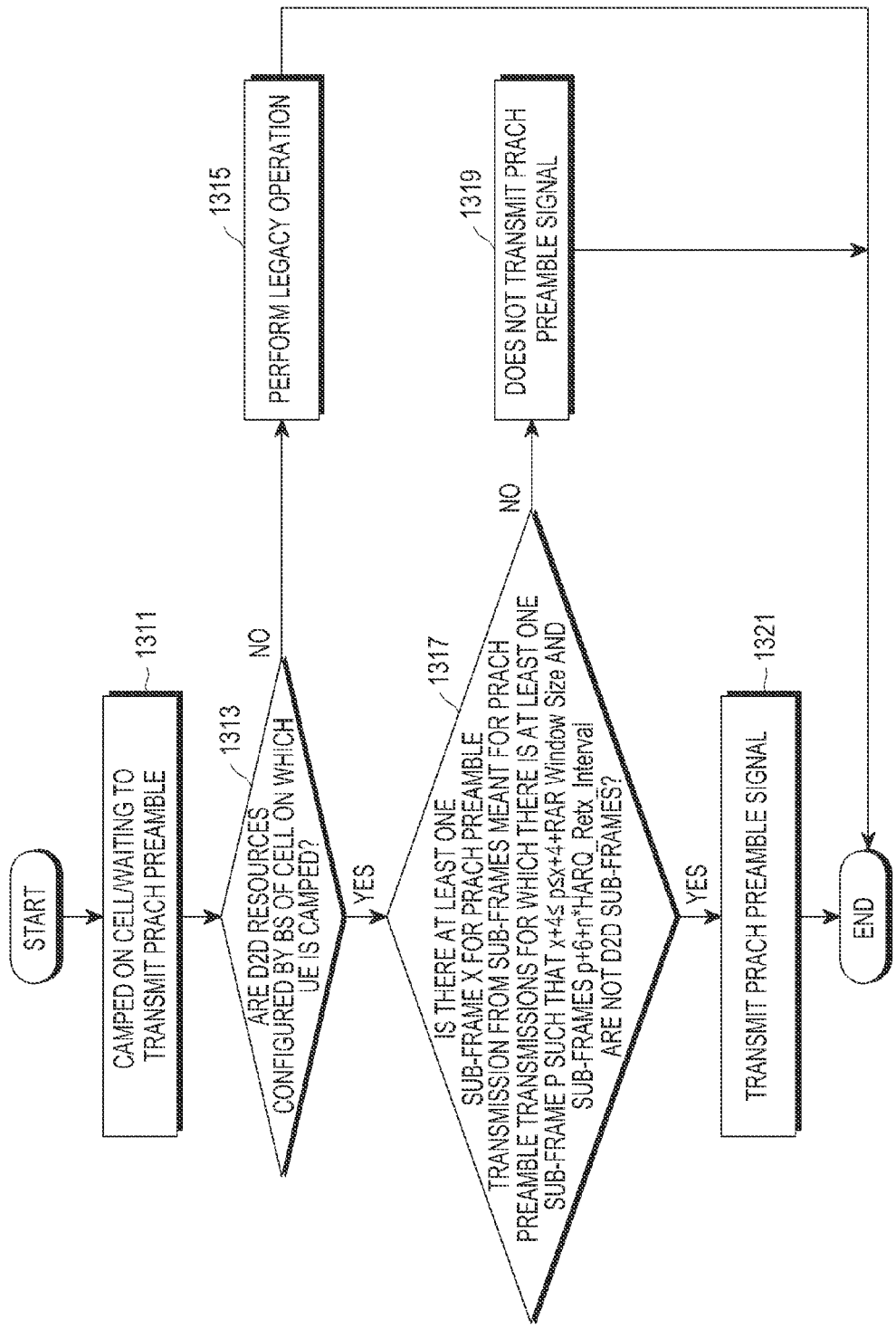
FIG. 13 schematically illustrates a message collision handling scheme #2 in a communication system supporting a D2D scheme according to an embodiment of the present disclosure.

FIG. 13 schematically illustrates an MSG 3 collision handling scheme #2 in a communication system supporting a D2D scheme according to an embodiment of the present disclosure.

Referring to FIG. 13, in an MSG 3 collision handling scheme #2, a UE selects a sub-frame for a PRACH preamble transmission such that an MSG 3 collision is avoided. In the MSG 3 collision handling scheme #2, the UE detects D2D resource configuration information signaled by a BS irrespective of whether the UE supports a D2D feature. The UE performs a sub-frame selecting operation for a PRACH preamble only if the BS designates and/or allocates certain sub-frames for a D2D scheme.

A UE is camped on a cell and waiting to transmit a PRACH preamble at operation 1311. The UE determines whether D2D resources are configured by a BS of the cell on which the UE is camped at operation 1313. If the D2D resources are not configured by the BS of the cell on which the UE is camped, the UE performs a legacy operation at operation 1315. A detailed operation of the legacy operation will be omitted herein.

If the D2D resources are configured by the BS of the cell on which the UE is camped, the UE determines whether there is at least one sub-frame x for a PRACH preamble transmission from a plurality of sub-frames meant for PRACH preamble transmissions for which there is at least one sub-frame p, such that x+4≤p≤x+4+RARWindowSize and sub-frames p+6+n*HARQ_Retx_Interval are not D2D sub-frames at operation 1317. Here, n is set to an integer which is from 0 to one less than a maximum number of MSG 3 transmissions.

If there is no sub-frame x for the PRACH preamble transmission from the plurality of the sub-frames meant for the PRACH preamble transmissions for which there is the at least one sub-frame p, such that the x+4≤p≤x+4+RARWindowSize and the sub-frames p+6+n*HARQ_Retx_Interval are not the D2D sub-frames, the UE does not transmit a PRACH preamble signal at operation 1319.

If there is the at least one sub-frame x for the PRACH preamble transmission from the plurality of the sub-frames meant for the PRACH preamble transmissions for which there is the at least one sub-frame p, such that the x+4≤p≤x+4+RARWindow Size and the sub-frames p+6+n*HARQ_Retx_Interval are not the D2D sub-frames, the UE transmits a PRACH preamble signal in one of the determined sub-frames at operation 1321.

That is, in an MSG 3 collision handling scheme #2, if there is at least one sub-frame p such that x+4≤p≤x+4+RARWindow Size and sub-frames p+6+n*HARQ_Retx_Interval are not D2D sub-frames, a UE selects a sub-frame x for a PRACH preamble transmission from a plurality of sub-frames meant for the PRACH preamble transmission.

Alternatively, if the UE is unable to determine a sub-frame for a PRACH preamble transmission, the UE will not transmit a PRACH preamble.

Although FIG. 13 illustrates an MSG 3 collision handling scheme #2 in a communication system supporting a D2D scheme according to an embodiment of the present disclosure, various changes could be made to FIG. 13. For example, although shown as a series of operations, various operations in FIG. 13 could overlap, occur in parallel, occur in a different order, or occur multiple times.

An MSG 3 collision handling scheme #2 in a communication system supporting a D2D scheme according to an embodiment of the present disclosure has been described with reference to FIG. 13, and an example of a process of determining a PRACH preamble sub-frame which is based on an MSG 3 collision handling scheme #2 in a communication system supporting a D2D scheme according to an embodiment of the present disclosure will be described with reference to FIG. 14.

Figure 14:
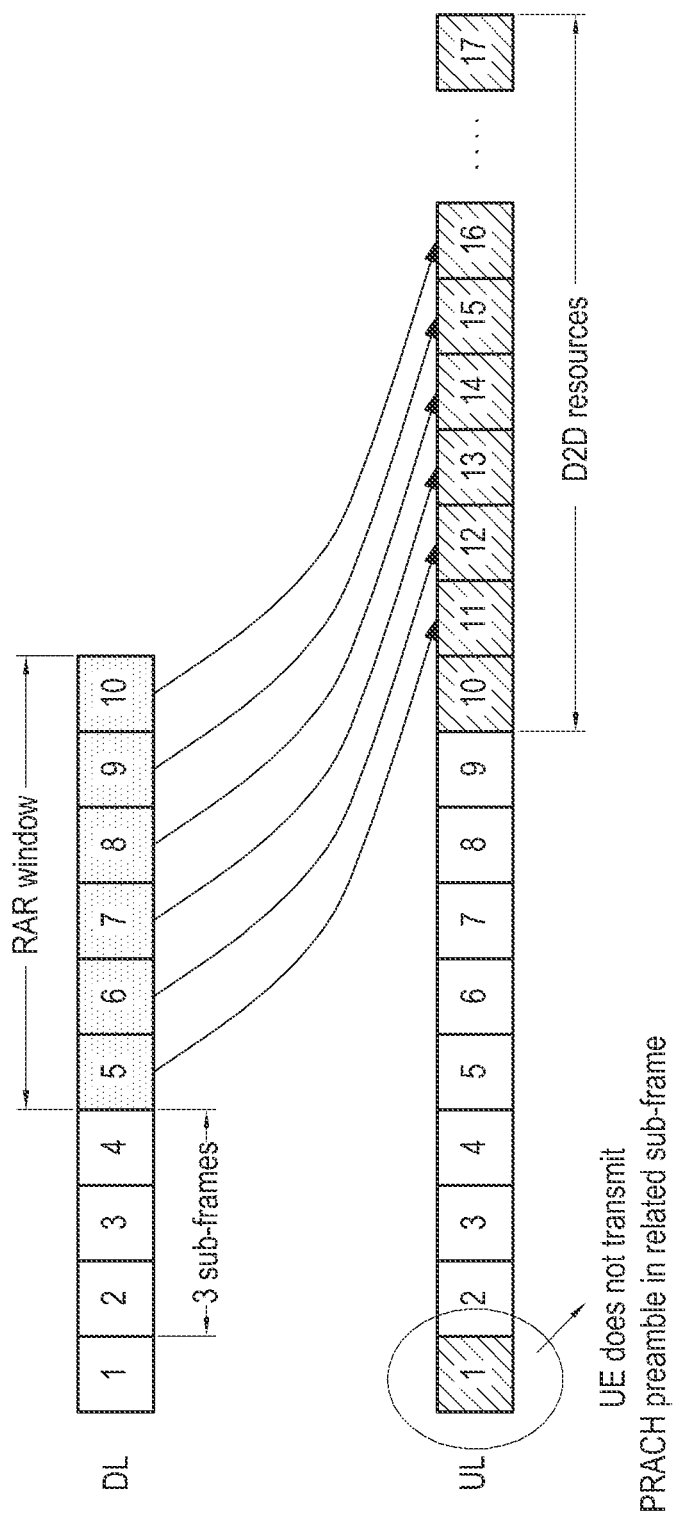
FIG. 14 schematically illustrates an example of a process of determining a PRACH preamble sub-frame which is based on a message collision handling scheme #2 in a communication system supporting a D2D scheme according to an embodiment of the present disclosure.

FIG. 14 schematically illustrates an example of a process of determining a PRACH preamble sub-frame which is based on an MSG 3 collision handling scheme #2 in a communication system supporting a D2D scheme according to an embodiment of the present disclosure.

Referring to FIG. 14, for a sub-frame 1, a UE determines whether there is a sub-frame p such that 5≤p≤11 and sub-frames p+6+n*8 are not D2D sub-frames and n is set to an integer which is from 0 to 3. In FIG. 14, an HARQ_Retx_Interval is set to an interval including 8 sub-frames, and a RAR window is set to an interval including 6 sub-frames. Here, a maximum number of MSG 3 transmissions is set to 4. In FIG. 14, if a sub-frame p is not detected, a UE may not transmit a PRACH preamble in a sub-frame 1.

An example of a process of determining a PRACH preamble sub-frame which is based on an MSG 3 collision handling scheme #2 in a communication system supporting a D2D scheme according to an embodiment of the present disclosure has been described with reference to FIG. 14, and another example of a process of determining a PRACH preamble sub-frame which is based on an MSG 3 collision handling scheme #2 in a communication system supporting a D2D scheme according to an embodiment of the present disclosure will be described with reference to FIG. 15.

Figure 15:
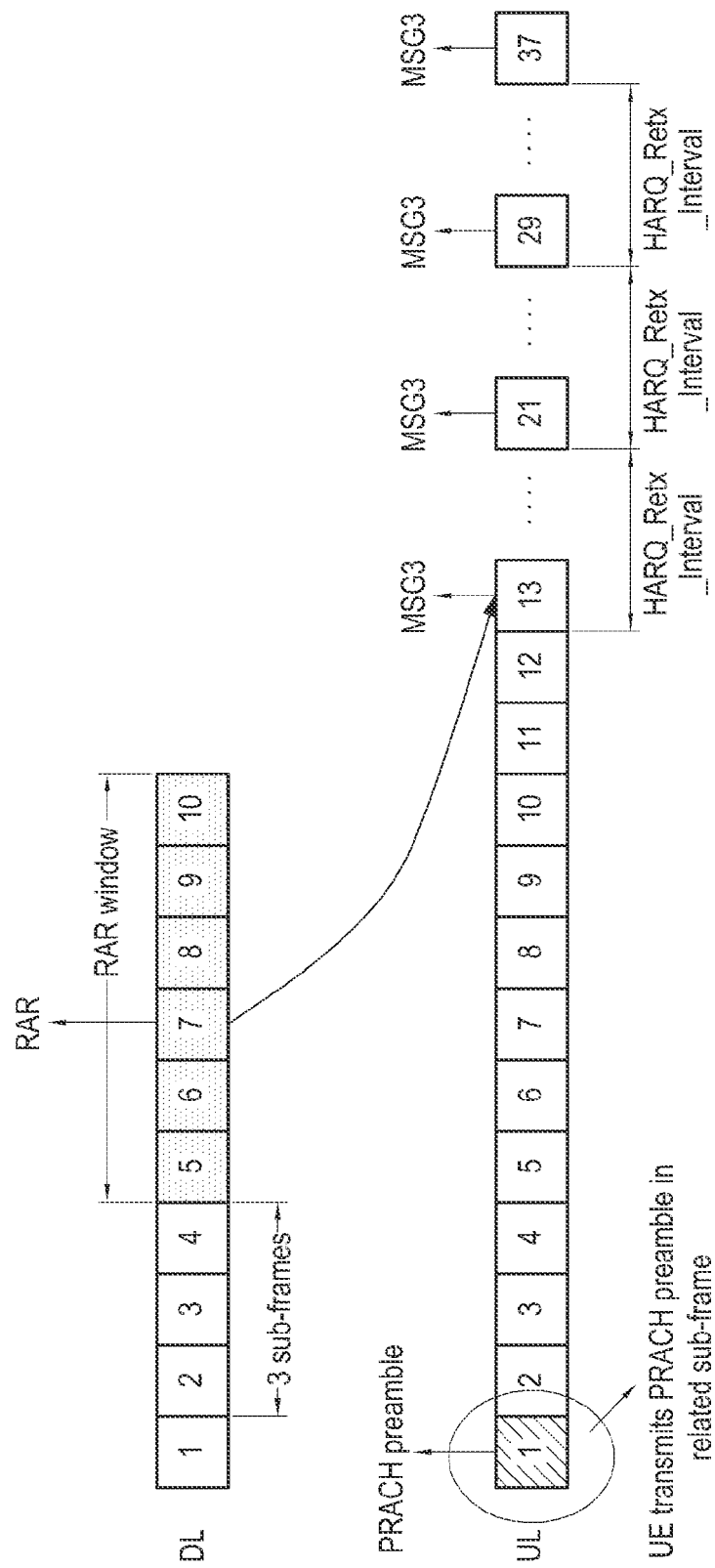
FIG. 15 schematically illustrates another example of a process of determining a PRACH preamble sub-frame which is based on a message collision handling scheme #2 in a communication system supporting a D2D scheme according to an embodiment of the present disclosure.

FIG. 15 schematically illustrates another example of a process of determining a PRACH preamble sub-frame which is based on an MSG 3 collision handling scheme #2 in a communication system supporting a D2D scheme according to an embodiment of the present disclosure.

Referring to FIG. 15, for a sub-frame 1, a UE determines whether there is a sub-frame p such that 5≤p≤11 and sub-frames p+6+n*8 are not D2D sub-frames, and n is set to an integer which is from 0 to 3. In FIG. 15, an HARQ_Retx_Interval is set to an interval including 8 sub-frames, a RAR window is set to an interval including 6 sub-frames, and a maximum number of MSG 3 transmissions is set to 4. In FIG. 15, a sub-frame 'p=7' is detected for which sub-frames 7+6+n*8 are not D2D sub-frames, so the UE may transmit a PRACH preamble in a sub-frame 1.

Meanwhile, an MSG 3 collision handling scheme #1 and an MSG 3 collision handling scheme #2 may be used together. In this case, a UE capable of determining D2D resources configured by a BS operates based on the MSG 3 collision handling scheme #2. The BS operates for other UEs, and handles an MSG 3 collision based on the MSG 3 collision handling scheme #1. Alternatively, the BS may operate based on the MSG 3 collision handling scheme #2 without classifying UEs.

Thirdly, an MSG 3 collision handling scheme #3 will be described below.

An example of configuring a D2D resource and a RAR window size which is based on an MSG 3 collision handling scheme #3 in a communication system supporting a D2D scheme according to an embodiment of the present disclosure will be described with reference to FIG. 16.

Figure 16:
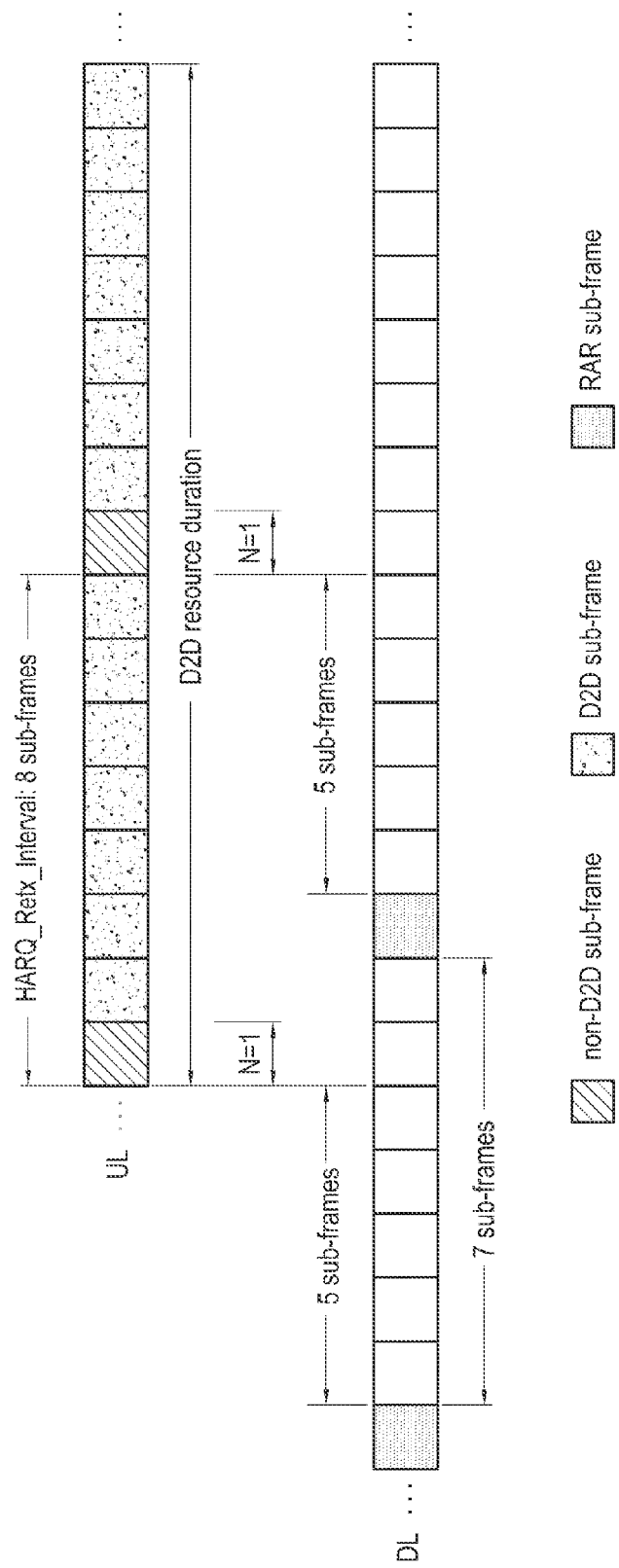
FIG. 16 schematically illustrates an example of configuring a D2D resource and a RAR window size which is based on a message collision handling scheme #3 in a communication system supporting a D2D scheme according to an embodiment of the present disclosure.

FIG. 16 schematically illustrates an example of configuring a D2D resource and a RAR window size which is based on an MSG 3 collision handling scheme #3 in a communication system supporting a D2D scheme according to an embodiment of the present disclosure.

Referring to FIG. 16, in an MSG 3 collision handling scheme #3, a BS reserves certain sub-frames in D2D resource duration as non D2D sub-frames.

As illustrated in FIG. 16, N consecutive sub-frames at an interval of an HARQ_Retx_Interval are configured as non D2D resources. A BS also sets a size of a RAR window which is large than (HARQ_Retx_Interval-N)(RAR Window Size>(HARQ_Retx_Interval-N)). If the RAR window size is set in this way, each RAR window will include a sub-frame for transmitting a RAR such that an MSG 3 does not collide.

As illustrated in FIG. 16, an 'N=1' sub-frame is configured as a non-D2D sub-frame in D2D resource duration. A RAR window size is set to a value larger than 7, i.e., RAR window size>7. By setting the RAR window size in this way, each RAR window will include at least one sub-frame for transmitting a RAR such that an MSG3 does not collide.

An example of configuring a D2D resource and a RAR window size which is based on an MSG 3 collision handling scheme #3 in a communication system supporting a D2D scheme according to an embodiment of the present disclosure has been described with reference to FIG. 16, and another example of configuring a D2D resource and a RAR window size which is based on an MSG 3 collision handling scheme #3 in a communication system supporting a D2D scheme according to an embodiment of the present disclosure will be described with reference to FIG. 17.

Figure 17:
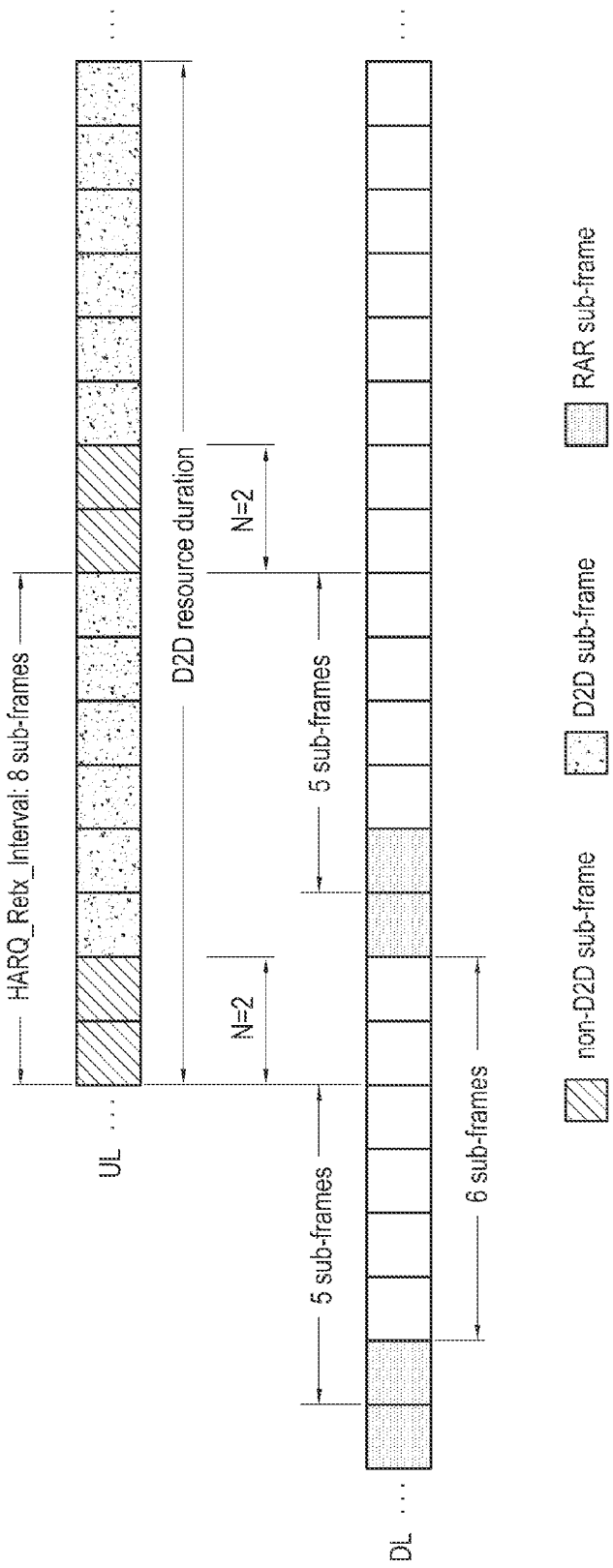
FIG. 17 schematically illustrates another example of configuring a D2D resource and a RAR window size which is based on a message collision handling scheme #3 in a communication system supporting a D2D scheme according to an embodiment of the present disclosure.

FIG. 17 schematically illustrates another example of configuring a D2D resource and a RAR window size which is based on an MSG 3 collision handling scheme #3 in a communication system supporting a D2D scheme according to an embodiment of the present disclosure.

Referring to FIG. 17, N consecutive sub-frames at an interval of an HARQ_Retx_Interval are configured as non-D2D resources. A BS also sets a size of a RAR window which is large than (HARQ_Retx_Interval-N)(RAR Window Size>(HARQ_Retx_Interval-N)). If the RAR window size is set in this way, each RAR window will include a sub-frame for transmitting a RAR such that an MSG 3 does not collide.

As illustrated in FIG. 17, an 'N=2' sub-frame is configured as a non-D2D sub-frame in D2D resource duration. A RAR window size is set to a value larger than 6, i.e., RAR window size>6. By setting the RAR window size in this way, each RAR window will include at least one sub-frame for transmitting a RAR such that an MSG3 does not collide.

Fourthly, an MSG 3 collision handling scheme #4 will be described below.

An example of configuring a D2D resource and a RAR window size which is based on an MSG 3 collision handling scheme #4 in a communication system supporting a D2D scheme according to an embodiment of the present disclosure will be described with reference to FIG. 18.

Figure 18:
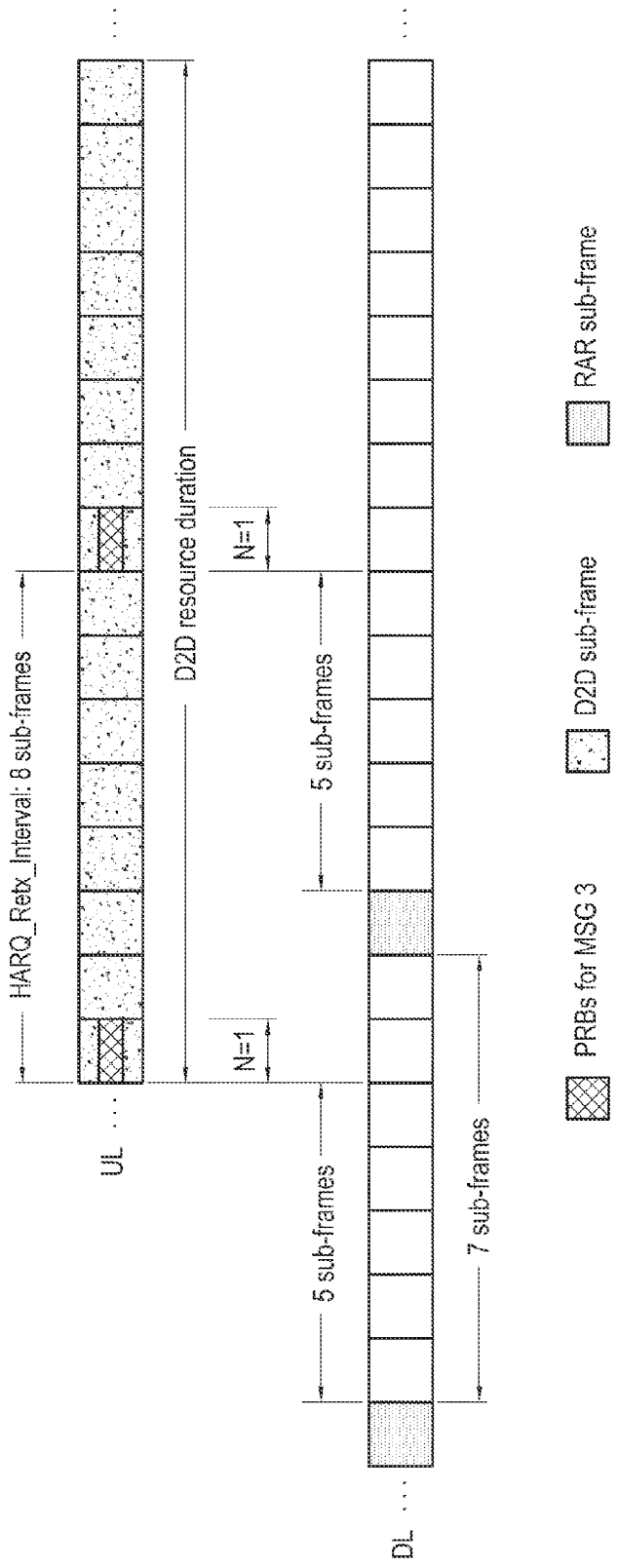
FIG. 18 schematically illustrates an example of configuring a D2D resource and a RAR window size which is based on a message collision handling scheme #4 in a communication system supporting a D2D scheme according to an embodiment of the present disclosure.

FIG. 18 schematically illustrates an example of configuring a D2D resource and a RAR window size which is based on an MSG 3 collision handling scheme #4 in a communication system supporting a D2D scheme according to an embodiment of the present disclosure.

Referring to FIG. 18, in an MSG 3 collision handling scheme #4, a BS reserves certain PRBs in certain sub-frames in D2D resource duration as non D2D sub-frames.

As illustrated in FIG. 18, PRBs are reserved in N consecutive sub-frames, wherein N may be equal to 1, at an interval of an HARQ_Retx_Interval among D2D sub-frames. A BS also sets a RAR window size which is large than (HARQ_Retx_Interval-N)(RAR Window Size>(HARQ_Retx_Interval-N)). If the RAR window size is set in this way, each RAR window will include a sub-frame for transmitting a RAR such that an MSG 3 does not collide. The BS may configure certain PRBs which are before and after MSG 3 PRBs as non-D2D PRBs in order to avoid an in-band emission from a D2D transmission.

An example of configuring a D2D resource and a RAR window size, which is based on an MSG 3 collision handling scheme #4 in a communication system supporting a D2D scheme according to an embodiment of the present disclosure, has been described with reference to FIG. 18, and another example of configuring a D2D resource and a RAR window size which is based on an MSG 3 collision handling scheme #4 in a communication system supporting a D2D scheme according to an embodiment of the present disclosure will be described with reference to FIG. 19.

Figure 19:
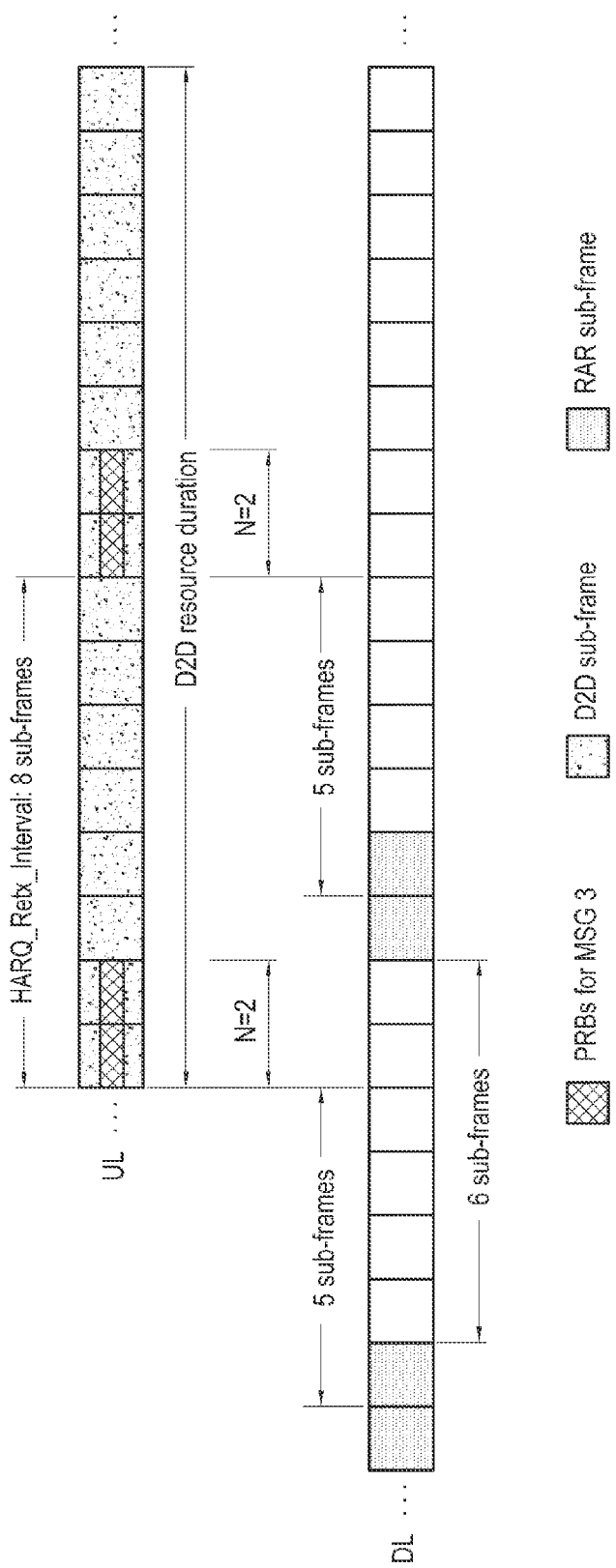
FIG. 19 schematically illustrates another example of configuring a D2D resource and a RAR window size which is based on a message collision handling scheme #4 in a communication system supporting a D2D scheme according to an embodiment of the present disclosure.

FIG. 19 schematically illustrates another example of configuring a D2D resource and a RAR window size which is based on an MSG 3 collision handling scheme #4 in a communication system supporting a D2D scheme according to an embodiment of the present disclosure.

Referring to FIG. 19, PRBs are reserved in N consecutive sub-frames, wherein N may be equal to 2, at an interval of an HARQ_Retx Interval_among D2D sub-frames. A BS also sets a RAR window size which is large than (HARQ_Retx_Interval-N)(RAR Window Size>(HARQ_Retx_Interval-N)). If the RAR window size is set in this way, each RAR window will include a sub-frame for transmitting a RAR such that an MSG 3 does not collide. The BS may configure certain PRBs which are before and after MSG 3 PRBs as non-D2D PRBs in order to avoid an in-band emission from a D2D transmission.

Fifthly, an MSG 3 collision handling scheme #5 will be described below.

In the MSG 3 collision handling scheme #5, if a PRACH preamble is received, and a BS needs to schedule an MSG 3 transmission in D2D sub-frames, the BS may reconfigure D2D resources. The reconfiguration may be done by transmitting a physical downlink control channel (PDCCH) signal.

A SIB modification scheme is not feasible as a modification period is in order of seconds. The BS may know about a required modification approximately 12 sub-frames before an actual D2D sub-frame. A D2D TX UE needs to monitor a PDCCH corresponding to a D2D sub-frame. Upon modifying D2D resource configuration information, the BS indicates that sub-frames scheduled for an MSG 3 are not for a D2D scheme, or the BS indicates that specific PRBs in sub-frames scheduled for an MSG 3 are not for a D2D scheme.

Schemes of handing an MSG 3 collision in a communication system supporting a D2D scheme according to an embodiment of the present disclosure have been described above, and a prioritizing scheme between a D2D discovery transmission/reception and an uplink (UL) wide area network (WAN) transmission which is related to a random access procedure within the same subframe in a communication system supporting a D2D scheme according to an embodiment of the present disclosure will be described below.

Firstly, a PRACH preamble transmission will be described below.

Firstly, resources for a PRACH preamble transmission and D2D discovery resources may be configured in the same sub-frame. That is, the resources for the PRACH preamble transmission and the D2D discovery resources may be frequency division multiplexed to be included in the same sub-frame. A UE may not transmit both a PRACH preamble and a D2D discovery signal in the same sub-frame due to a difference in timing of a PRACH preamble transmission and a D2D discovery transmission, and power constraints. So, prioritization for a PRACH preamble transmission and a D2D discovery transmission in one sub-frame is needed if the UE is involved in both the PRACH preamble transmission and the D2D discovery transmission.

Even if a dedicated D2D discovery resource, i.e., a type 2 D2D discovery resource, and a resource for a PRACH preamble transmission are configured in the same sub-frame, prioritization for the type 2 D2D discovery resource and the resource for the PRACH preamble transmission is needed. A BS may schedule a type 2 D2D discovery resource in a sub-frame other than sub-frames in which resources for a PRACH preamble transmission are configured. However, this scheduling may not be always possible. For example, if a value of a PRACH-ConfigIndex is set to 14 in PRACH configuration, every sub-frame includes a PRACH resource. D2D discovery transmissions using a type 2 D2D discovery resource or a type 1 D2D discovery resource, i.e., a contention-based discovery resource, are periodically performed, and skipping the D2D discovery transmission has no significant impact to D2D discovery.

So, in an embodiment of the present disclosure, it will be assumed that a PRACH preamble transmission is prioritized over a D2D discovery transmission in an arbitrary sub-frame if resources for a PRACH preamble transmission and D2D discovery resources for a transmission are frequency division multiplexed in the same sub-frame. A type of the D2D discovery resources for the transmission may be a type 1 or a type 2.

Alternatively, it will be assumed that a PRACH preamble transmission may be prioritized over a D2D discovery transmission using type 1 D2D discovery resources in a sub-frame if a resource for a PRACH preamble transmission and a type 1 D2D discovery resource for a transmission are frequency division multiplexed in the same sub-frame.

If a resource for a PRACH preamble transmission and a type 2 D2D discovery resource are frequency division multiplexed in the same sub-frame, a D2D discovery transmission using the type 2 discovery resource may be prioritized over the PRACH preamble transmission.

A D2D signal reception and a UL WAN transmission do not use a full duplex on a given carrier. So, a UE may not transmit a PRACH preamble and receive D2D discovery information in the same sub-frame. The UE needs to determine a priority for a D2D discovery reception and a priority for a PRACH preamble transmission if a PRACH resource and a D2D discovery resource for a reception are frequency division multiplexed in the same sub-frame. In this case, prioritizing a PRACH preamble transmission may reduce access delay of the UE. A D2D discovery reception is not critical as D2D discovery information is periodically transmitted. So, in an embodiment of the present disclosure, it will be assumed that the UE prioritizes the PRACH preamble transmission over the D2D discovery reception if the PRACH resources and the D2D discovery resources for the reception are frequency division multiplexed in the same sub-frame. A type of the D2D discovery resources for the reception may be a type 1 or a type 2.

Secondly, an MSG 3 transmission will be described below.

Resources for an MSG 3 transmission during a random access procedure are assigned to a UE in a dedicated manner. If a RAR is received in a sub-frame n, resources for the first transmission of an MSG 3 correspond to a sub-frame n+6. If D2D discovery resources for a transmission or D2D discovery resources for a reception are configured in a sub-frame which is identical to a sub-frame which corresponds to an MSG 3 transmission, i.e., the D2D discovery resources for the transmission or the D2D discovery resources for the reception are frequency division multiplexed in the sub-frame which is identical to the sub-frame which corresponds to the MSG 3 transmission, a UE needs to prioritize for a D2D discovery transmission/reception and an MSG 3 transmission.

Similar to PRACH preamble prioritization, in an embodiment of the present disclosure, it will be proposed that a UE prioritize an MSG 3 transmission over a D2D discovery transmission/reception if MSG 3 resources and D2D discovery resources for a transmission/reception are frequency division multiplexed in the same sub-frame.

Alternatively, a priority for an MSG 3 transmission may be set to a priority which is higher than a priority for a D2D discovery transmission using type 1 D2D discovery resources in one sub-frame if resources for the MSG 3 transmission and the type 1 D2D discovery resources for the D2D discovery transmission are frequency division multiplexed in the same sub-frame. Alternatively, a priority for a D2D discovery transmission using type 1 D2D discovery resources may be set to a priority which is higher than a priority for an MSG 3 transmission if resources for the MSG 3 transmission and the type 1 D2D discovery resources for the D2D discovery transmission are frequency division multiplexed in the same sub-frame.

A process of performing a D2D discovery transmitting operation using a type 1 D2D discovery resource in a UE in a communication system supporting a D2D scheme according to an embodiment of the present disclosure will be described with reference to FIG. 20.

Figure 20:
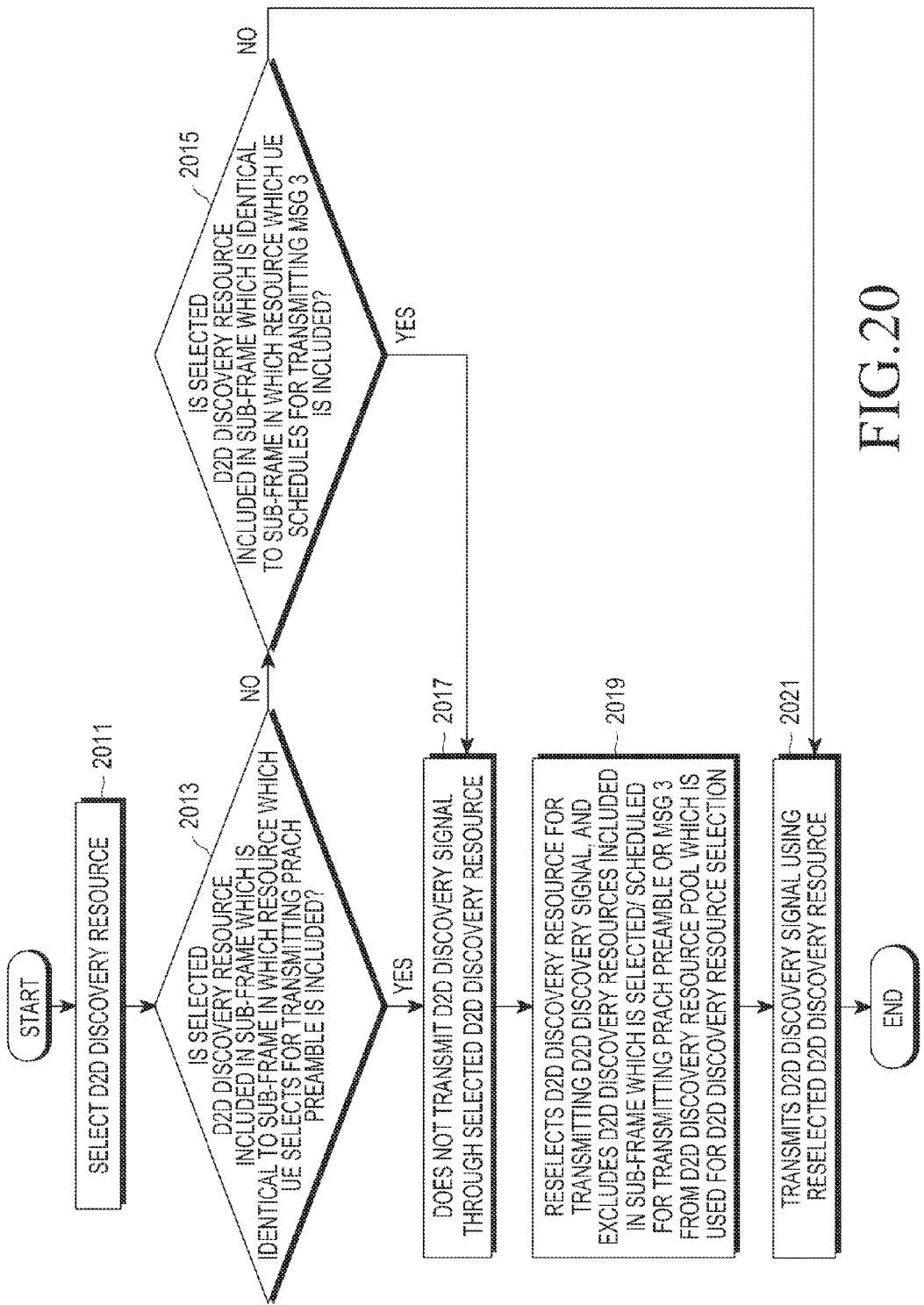
FIG. 20 schematically illustrates a process of performing a D2D discovery transmitting operation using a type 1 D2D discovery resource in a UE in a communication system supporting a D2D scheme according to an embodiment of the present disclosure.

FIG. 20 schematically illustrates a process of performing a D2D discovery transmitting operation using a type 1 D2D discovery resource in a UE in a communication system supporting a D2D scheme according to an embodiment of the present disclosure.

Referring to FIG. 20, the UE selects a D2D discovery resource for transmitting a D2D discovery signal at operation 2011. The UE determines whether the selected D2D discovery resource is included in a sub-frame which is identical to a sub-frame in which a resource which the UE selects for transmitting a PRACH preamble is included at operation 2013. If the selected D2D discovery resource is not included in the sub-frame which is identical to the sub-frame in which the resource which the UE selects for transmitting the PRACH preamble is included, the UE determines whether the selected D2D discovery resource is included in a sub-frame which is identical to a sub-frame in which a resource which the UE schedules for transmitting an MSG 3 is included at operation 2015.

If it is determined, in operation 2015, that the selected D2D discovery resource is included in the sub-frame which is identical to the sub-frame in which the resource which the UE schedules for transmitting the MSG 3 is included, the UE proceeds to operation 2017. If it is determined, in operation 2015, that the selected D2D discovery resource is not included in the sub-frame which is identical to the sub-frame in which the resource which the UE schedules for transmitting the MSG 3 is included, the UE proceeds to operation 2021.

If it is determined, in operation 2013, that the selected D2D discovery resource is included in the sub-frame which is identical to the sub-frame in which the resource which the UE selects for transmitting the PRACH preamble is included, the UE does not transmit a D2D discovery signal through the selected D2D discovery resource at operation 2017.

The UE reselects a D2D discovery resource for transmitting the D2D discovery signal, and excludes D2D discovery resources included in a sub-frame which is selected and/or scheduled for transmitting a PRACH preamble or an MSG 3 from a D2D discovery resource pool which is used for D2D discovery resource selection at operation 2019. The UE transmits a D2D discovery signal using the reselected D2D discovery resource at operation 2021.

Although FIG. 20 illustrates a process of performing a D2D discovery transmitting operation using a type 1 D2D discovery resource in a UE in a communication system supporting a D2D scheme according to an embodiment of the present disclosure, various changes could be made to FIG. 20. For example, although shown as a series of operations, various operations in FIG. 20 could overlap, occur in parallel, occur in a different order, or occur multiple times.

A process of performing a D2D discovery transmitting operation using a type 1 D2D discovery resource in a UE in a communication system supporting a D2D scheme according to an embodiment of the present disclosure has been described with reference to FIG. 20, and a process of performing a D2D discovery transmitting operation using a type 2 D2D discovery resource in a UE in a communication system supporting a D2D scheme according to an embodiment of the present disclosure has been described with reference to FIG. 21.

Figure 21:
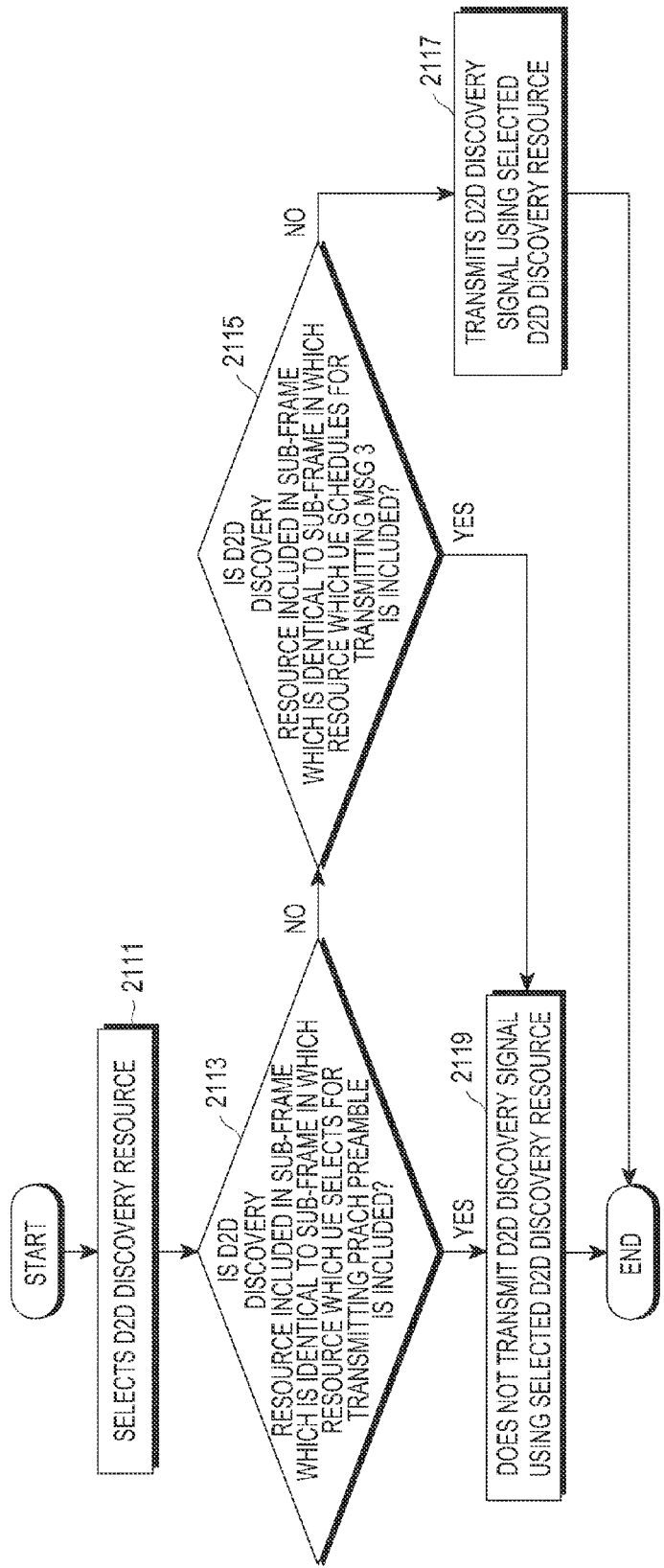
FIG. 21 schematically illustrates a process of performing a D2D discovery transmitting operation using a type 2 D2D discovery resource in a user equipment (UE) in a communication system supporting a D2D scheme according to an embodiment of the present disclosure.

FIG. 21 schematically illustrates a process of performing a D2D discovery transmitting operation using a type 2 D2D discovery resource in a UE in a communication system supporting a D2D scheme according to an embodiment of the present disclosure.

Referring to FIG. 21, the UE selects a dedicated resource, i.e., a D2D discovery resource, for transmitting a D2D discovery signal at operation 2111. The UE determines whether the D2D discovery resource is included in a sub-frame which is identical to a sub-frame in which a resource which the UE selects for transmitting a PRACH preamble is included at operation 2113. If the selected D2D discovery resource is not included in the sub-frame which is identical to the sub-frame in which the resource which the UE selects for transmitting the PRACH preamble is included, the UE determines whether the D2D discovery resource is included in a sub-frame which is identical to a sub-frame in which a resource which the UE schedules for transmitting an MSG 3 is included at operation 2115. If the D2D discovery resource is not included in the sub-frame which is identical to the sub-frame in which the resource which the UE schedules for transmitting the MSG 3 is included, the UE transmits a D2D discovery signal using the selected D2D discovery resource at operation 2117.

If it is determined, in operation 2113, that the D2D discovery resource is included in the sub-frame which is identical to the sub-frame in which the resource which the UE schedules for transmitting the MSG 3 is included, the UE proceeds to an operation 2119. If it is determined, in operation 2115, that the selected D2D discovery resource is included in the sub-frame which is identical to the sub-frame in which the resource which the UE selects for transmitting the PRACH preamble is included, the UE proceeds to an operation 2119. The UE does not transmit a D2D discovery signal using the selected D2D discovery resource at an operation 2119.

Although FIG. 21 illustrates a process of performing a D2D discovery transmitting operation using a type 2 D2D discovery resource in a UE in a communication system supporting a D2D scheme according to an embodiment of the present disclosure, various changes could be made to FIG. 21. For example, although shown as a series of operations, various operations in FIG. 21 could overlap, occur in parallel, occur in a different order, or occur multiple times.

A prioritizing scheme between a D2D discovery transmission/reception and a UL WAN transmission which is related to a random access procedure in the same frame in a communication system supporting a D2D scheme according to an embodiment of the present disclosure has been described above, and a prioritizing scheme between a D2D reception and a UL WAN transmission which is related to a random access procedure in a frequency division duplexing (FDD) system according to an embodiment of the present disclosure will be described below.

Firstly, a RAR reception will be described below.

After a PRACH preamble is transmitted, a UE monitors a PDCCH/physical downlink shared channel (PDSCH) for a RAR which is identified by a random access-radio network temporary indicator (RA-RNTI) in a RAR window. The RAR window starts at the first sub-frame after an interval which includes the last sub-frame of a preamble transmission and 3 additional sub-frames, and includes sub-frames which correspond to a RAR window size.

During the RAR window, the UE needs to monitor a downlink (DL) for a RAR, and may also need to monitor a UL for a D2D discovery signal reception in an FDD system. However, a UE with one receiving chain (RX chain) may not simultaneously monitor a DL and a UL. That is, the UE needs to prioritize a RAR reception and a D2D discovery signal reception if the UE does not have an additional RX chain for the D2D discovery signal reception. The RAR reception is more critical than the D2D discovery signal reception as the RAR reception impacts access delay of the UE. So, in an embodiment of the present disclosure, it will be assumed that a priority for a RAR reception is higher than a priority for a D2D discovery signal reception in an FDD system if the UE does not have an additional RX chain for the D2D discovery signal reception.

Secondly, DL monitoring while a contention resolution timer is running will be described below.

After an MSG 3 is transmitted, a UE starts a contention resolution timer, and monitors a DL until the contention resolution timer expires or is stopped. The contention resolution timer is stopped if the UE receives a cell-radio network temporary identifier (C-RNTI) of the UE, and a PDCCH signal which is addressed to a temporary C-RNTI followed by a medium access control (MAC) protocol data unit (PDU) with a resolution identity which is set to a common control channel (CCCH) service data unit (SDU) which is transmitted by the UE in an MSG 3.

While the contention resolution timer is running, the UE needs to monitor a DL, and may also need to monitor a UL for a D2D discovery reception in an FDD system. Here, a UE with one RX chain may not simultaneously monitor a DL and a UL. So, the UE needs to determine a priority for DL monitoring and a priority for a D2D discovery signal reception if the UE does not have an additional RX chain for the D2D discovery reception. The DL monitoring is more critical than the D2D discovery signal reception as the DL monitoring impacts access delay of the UE. So, in an embodiment of the present disclosure, it will be assumed that a priority for PDCCH monitoring is higher than a priority for a D2D discovery signal reception if the UE does not have an additional RX chain for the D2D discovery signal reception.

A prioritization scheme between a D2D reception and a DL WAN transmission, which is related to a random access procedure in an FDD system, has been described above, and prioritization schemes for a D2D data/control packet transmission/reception and a random access procedure, i.e., a prioritization scheme #1 for a D2D data/control packet transmission/reception and a random access procedure, a prioritization scheme #2 for a D2D data/control packet transmission/reception and a random access procedure, a prioritization scheme #3 for a D2D data/control packet transmission/reception and a random access procedure, a prioritization scheme #4 for a D2D data/control packet transmission/reception and a random access procedure, a prioritization scheme #5 for a D2D data/control packet transmission/reception and a random access procedure, and a prioritization scheme #6 for a D2D data/control packet transmission/reception and a random access procedure will be described below.

Firstly, a prioritization scheme #1 for a D2D data/control packet transmission/reception and a random access procedure will be described below.

A UE always prioritizes a D2D data/control packet transmission/reception over a UL WAN transmission related to a random access procedure, i.e., a PRACH preamble transmission and an MSG 3 transmission in a sub-frame. If the UE does not has an additional RX chain for receiving a D2D discovery signal, the UE always prioritizes a D2D data/control packet reception over a UL WAN reception related to a random access procedure, i.e., a PDCCH/PDSCH for a RAR and an MSG 4.

Secondly, a prioritization scheme #2 for a D2D data/control packet transmission/reception and a random access procedure will be described below.

A UE always prioritizes a UL WAN transmission related to a random access procedure, i.e., a PRACH preamble transmission and an MSG 3 transmission over a D2D data/control packet transmission/reception in a sub-frame. If the UE does not have an additional RX chain for receiving a D2D discovery signal, the UE always prioritizes a UL WAN reception related to a random access procedure, i.e., a PDCCH/PDSCH for a RAR and an MSG 4 over a D2D data/control packet transmission/reception.

Thirdly, a prioritization scheme #3 for a D2D data/control packet transmission/reception and a random access procedure will be described below.

A UE always prioritizes a PRACH preamble transmission over a D2D data/control packet transmission/reception in a sub-frame.

Fourthly, a prioritization scheme #4 for a D2D data/control packet transmission/reception and a random access procedure will be described below.

A UE dynamically determines a priority for a D2D data/control packet transmission/reception and a priority for a UL WAN transmission which is related to a PRACH. That is, the UE may prioritize the D2D data/control packet transmission/reception over the UL WAN transmission which is related to the PRACH, or prioritize the UL WAN transmission which is related to the PRACH over the D2D data/control packet transmission/reception. However, if a random access procedure is initiated, i.e., a PRACH preamble is transmitted, a priority which is related to a random access procedure, i.e., a priority for a UL WAN transmission and a DL WAN reception, is set to a priority which is higher than the priority for the D2D data/control packet transmission/reception.

Fifthly, a prioritization scheme #5 for a D2D data/control packet transmission/reception and a random access procedure will be described below.

A UE prioritizes a random access procedure over a D2D data/control packet transmission/reception if a random access is for a D2D communication. Alternatively, the UE prioritizes the D2D data/control packet transmission/reception over the random access procedure if the random access is not for the D2D communication.

Sixthly, a prioritization scheme #6 for a D2D data/control packet transmission/reception and a random access procedure will be described below.

A UE prioritizes a D2D data/control packet transmission over a UL WAN transmission which is related to a PRACH procedure. If a random access procedure is for a D2D communication, the UE prioritizes the UL WAN transmission over a D2D data/control packet reception. Alternatively, if the random access procedure is for the D2D communication, the UE prioritizes the D2D data/control packet reception over the UL WAN transmission.

A prioritization scheme for a D2D data/control packet transmission/reception and a random access procedure has been described above, and an inner structure of a BS in a communication system supporting a D2D scheme according to an embodiment of the present disclosure will be described with reference to FIG. 22.

Figure 22:
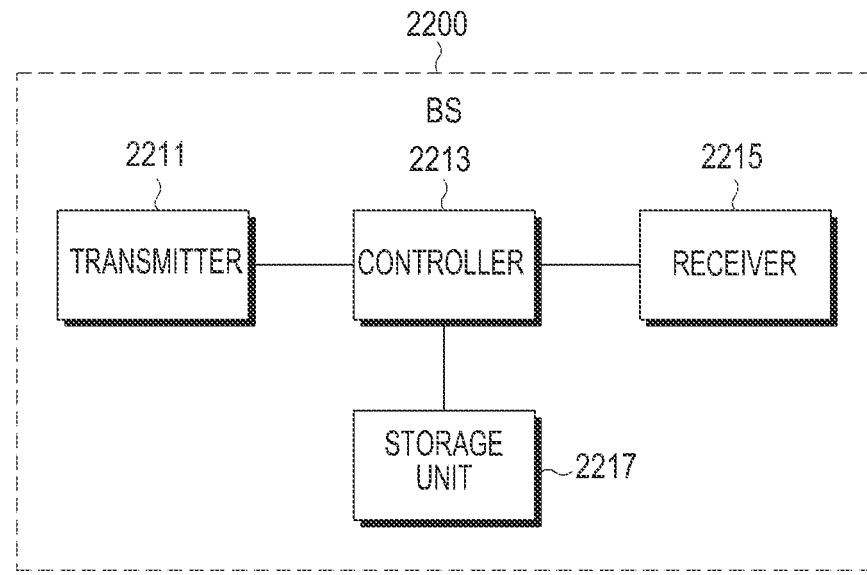
FIG. 22 schematically illustrates an inner structure of a base station (BS) in a communication system supporting a D2D scheme according to an embodiment of the present disclosure.

FIG. 22 schematically illustrates an inner structure of a BS in a communication system supporting a D2D scheme according to an embodiment of the present disclosure.

Referring to FIG. 22, a BS 2200 includes a transmitter 2211, a controller 2213, a receiver 2215, and a storage unit 2217.

The controller 2213 controls the overall operation of the BS 2200. More particularly, the controller 2213 controls the BS 2200 to perform an operation related to avoiding a collision between a random access transmission and a D2D transmission according to an embodiment of the present disclosure. The operation related to avoiding the collision between the random access transmission and the D2D transmission, according to an embodiment of the present disclosure, is performed in the manner described with reference to FIGS. 3 to 21, and a description thereof will be omitted herein.

The transmitter 2211 transmits various signals, various messages, and the like to a UE, and the like under a control of the controller 2213. The various signals, the various messages, and the like transmitted in the transmitter 2211 have been described in FIGS. 3 to 21, and a description thereof will be omitted herein.

The receiver 2215 receives various signals, various messages, and the like from the UE, and the like under a control of the controller 2213. The various signals, the various messages and the like received in the receiver 2215 have been described in FIGS. 3 to 21, and a description thereof will be omitted herein.

The storage unit 2217 stores a program and various data necessary for the operation of the BS 2200, information related to the operation of avoiding the collision between the random access transmission and the D2D transmission according to an embodiment of the present disclosure, and the like. The storage unit 2217 stores the various signals, the various messages, and the like received in the receiver 2215.

While the transmitter 2211, the controller 2213, the receiver 2215, and the storage unit 2217 are described as separate processors, it is to be understood that this is merely for convenience of description. In other words, two or more of the transmitter 2211, the controller 2213, the receiver 2215, and the storage unit 2217 may be incorporated into a single processor.

An inner structure of a BS in a communication system supporting a D2D scheme according to an embodiment of the present disclosure has been described with reference to FIG. 22, and an inner structure of a UE in a communication system supporting a D2D scheme according to an embodiment of the present disclosure will be described with reference to FIG. 23.

Figure 23:
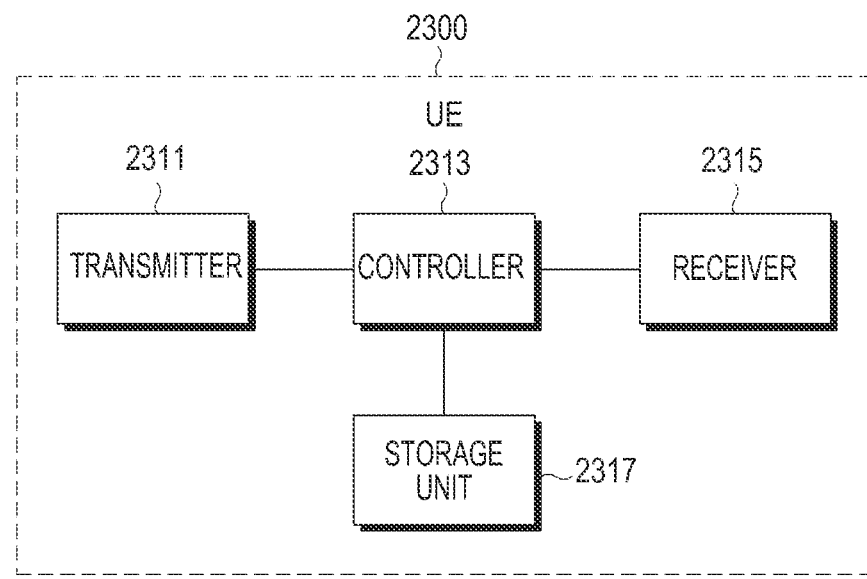
FIG. 23 schematically illustrates an inner structure of a UE in a communication system supporting a D2D scheme according to an embodiment of the present disclosure.

FIG. 23 schematically illustrates an inner structure of a UE in a communication system supporting a D2D scheme according to an embodiment of the present disclosure.

Referring to FIG. 23, a UE 2300 includes a transmitter 2311, a controller 2313, a receiver 2315, and a storage unit 2317.

The controller 2313 controls the overall operation of the UE 2300. More particularly, the controller 2313 controls the UE 2300 to perform an operation related to avoiding a collision between a random access transmission and a D2D transmission according to an embodiment of the present disclosure. The operation related to avoiding the collision between the random access transmission and the D2D transmission according to an embodiment of the present disclosure is performed in the manner described with reference to FIGS. 3 to 21, and a description thereof will be omitted herein.

The transmitter 2311 transmits various signals, various messages, and the like to a BS, and the like under a control of the controller 2313. The various signals, the various messages, and the like transmitted in the transmitter 2311 have been described in FIGS. 3 to 21, and a description thereof will be omitted herein.

The receiver 2315 receives various signals, various messages, and the like from the BS, and the like under a control of the controller 2313. The various signals, the various messages and the like received in the receiver 2315 have been described in FIGS. 3 to 21, and a description thereof will be omitted herein.

The storage unit 2317 stores a program and various data necessary for the operation of the UE 2300, information related to the operation of avoiding the collision between the random access transmission and the D2D transmission according to an embodiment of the present disclosure, and the like. The storage unit 2317 stores the various signals, the various messages, and the like received in the receiver 2315.

While the transmitter 2311, the controller 2313, the receiver 2315, and the storage unit 2317 are described as separate processors, it is to be understood that this is merely for convenience of description. In other words, two or more of the transmitter 2311, the controller 2313, the receiver 2315, and the storage unit 2317 may be incorporated into a single processor.

As is apparent from the foregoing description, an embodiment of the present disclosure enables avoiding of a collision between a D2D transmission and a random access transmission in a communication system supporting a D2D scheme.

An embodiment of the present disclosure enables avoiding of a collision between a D2D transmission and a random access transmission based on a type of a resource in a communication system supporting a D2D scheme.

An embodiment of the present disclosure enables avoiding of a collision between a D2D transmission and a random access transmission by considering a PRACH preamble collision in a communication system supporting a D2D scheme.

An embodiment of the present disclosure enables avoiding of a collision between a D2D transmission and a random access transmission by considering an in-band emission in a communication system supporting a D2D scheme.

An embodiment of the present disclosure enables avoiding of a collision between a D2D transmission and a random access transmission by considering a guard band for an in-band emission in a communication system supporting a D2D scheme.

An embodiment of the present disclosure enables avoiding of a collision between a D2D transmission and a random access transmission by considering power control for an in-band emission in a communication system supporting a D2D scheme.

An embodiment of the present disclosure enables avoiding of a collision between a D2D transmission and a random access transmission by considering an MSG 3 collision in a communication system supporting a D2D scheme.

An embodiment of the present disclosure enables avoiding of a collision between a D2D transmission and a random access transmission based on a priority for the D2D transmission and a priority for the random access transmission in a communication system supporting a D2D scheme.

An embodiment of the present disclosure enables avoiding of a collision between a D2D transmission and a random access transmission based on a priority for a D2D reception and a priority for the random access transmission in a communication system supporting a D2D scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable, e.g., computer-readable, storage medium, e.g., a CD, a DVD, a magnetic disk, a magnetic tape, and/or the like. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operating method of a user equipment (UE) in a communication system, the operating method comprising:
receiving configuration information associated with a random access resource;
receiving configuration information associated with a resource pool for transmitting a discovery signal; and
selecting, in a discovery period, a resource for transmitting the discovery signal from the resource pool,
wherein the resource is not overlapped with the random access resource.

2. The operating method of claim 1, wherein the random access resource includes a physical random access channel (PRACH) resource.

3. The operating method of claim 1, wherein the UE supports a sidelink.

4. The operating method of claim 1, wherein the configuration information associated with the random access resource includes configuration information associated with a physical random access channel (PRACH).

5. The operating method of claim 1, further comprising transmitting the discovery signal through the resource.

6. A user equipment (UE) in a communication system, the UE comprising:
at least one processor configured to:
receive configuration information associated with a random access resource,
receive configuration information associated with a resource pool for transmitting a discovery signal, and
select, in a discovery period, a resource for transmitting the discovery signal from the resource pool,
wherein the resource is not overlapped with the random access resource.

7. The UE of claim 6, wherein the random access resource includes a physical random access channel (PRACH) resource.

8. The UE of claim 6, wherein the UE supports a sidelink.

9. The UE of claim 6, wherein the configuration information associated with the random access resource includes configuration information associated with a physical random access channel (PRACH).

10. The UE of claim 6, further comprising:
a transceiver configured to transmit the discovery signal through the resource.

* * * * *